United States Patent
Andoni et al.

(10) Patent No.: US 11,106,978 B2
(45) Date of Patent: Aug. 31, 2021

(54) EXECUTION OF A GENETIC ALGORITHM WITH VARIABLE EVOLUTIONARY WEIGHTS OF TOPOLOGICAL PARAMETERS FOR NEURAL NETWORK GENERATION AND TRAINING

(71) Applicant: SparkCognition, Inc., Austin, TX (US)

(72) Inventors: Sari Andoni, Austin, TX (US); Keith D. Moore, Cedar Park, TX (US); Elmira M. Bonab, Austin, TX (US); Junhwan Choi, Austin, TX (US); Eric O. Korman, Austin, TX (US)

(73) Assignee: SPARKCOGNITION, INC., Austin, TX (US)

( * ) Notice: Subject to any disclaimer, the term of this patent is extended or adjusted under 35 U.S.C. 154(b) by 1028 days.

(21) Appl. No.: 15/699,353

(22) Filed: Sep. 8, 2017

(65) Prior Publication Data
US 2019/0080240 A1    Mar. 14, 2019

(51) Int. Cl.
*G06N 3/08* (2006.01)
*G06N 7/00* (2006.01)
*G06F 16/2455* (2019.01)

(52) U.S. Cl.
CPC ....... *G06N 3/084* (2013.01); *G06F 16/24566* (2019.01); *G06N 7/005* (2013.01)

(58) Field of Classification Search
CPC ... G06N 3/084; G06N 7/005; G06F 16/24566
See application file for complete search history.

(56) References Cited

U.S. PATENT DOCUMENTS

| 5,140,530 A | 8/1992 | Guha et al. |
| 6,721,647 B1 | 4/2004 | Kita et al. |
| 2003/0050902 A1 | 3/2003 | Buczak et al. |
| 2005/0209982 A1 | 9/2005 | Jin et al. |
| 2005/0246297 A1 | 11/2005 | Chen et al. |

(Continued)

FOREIGN PATENT DOCUMENTS

WO    2009140160 A1    11/2009

OTHER PUBLICATIONS

Miikkulainen et al., Evolving Deep Neural Networks, p. 18, Mar. 2017. (Year: 2017).*

(Continued)

*Primary Examiner* — Kamran Afshar
*Assistant Examiner* — Marshall L Werner
(74) *Attorney, Agent, or Firm* — Moore IP Law

(57) ABSTRACT

A method includes generating, by a processor of a computing device, an output set of models corresponding to a first epoch of a genetic algorithm and based on an input set of models of the first epoch. The input set and the output set includes data representative of a neural network. The method includes determining a particular model of the output set based on a fitness function. A first topological parameter of a first model of the input set is modified to generate the particular model of the output set. The method includes modifying a probability that the first topological parameter is to be changed by a genetic operation during a second epoch of the genetic algorithm that is subsequent to the first epoch. The method includes generating a second output set of models corresponding to the second epoch and based on the output set and the modified probability.

22 Claims, 15 Drawing Sheets

(56) References Cited

U.S. PATENT DOCUMENTS

| | | |
|---|---|---|
| 2005/0261953 A1 | 11/2005 | Malek et al. |
| 2007/0011114 A1 | 1/2007 | Chen et al. |
| 2007/0208677 A1 | 9/2007 | Goldberg et al. |
| 2019/0073591 A1 | 3/2019 | Andoni et al. |
| 2019/0130277 A1 | 5/2019 | Andoni et al. |

OTHER PUBLICATIONS

Salama et al., Learning Neural Network Structures with Ant Colony Algorithms, Swarm Intelligence vol. 9, issue 4, pp. 229-265, Dec. 2015. (Year: 2015).*

Arshad et al., Wind Power Prediction Using Genetic Programming Based Ensemble of Artificial Neural Networks (GPeANN), 12th International Conference on Frontiers of Information Technology, pp. 257-262, Dec. 2014. (Year: 2014).*

Miikkulainen et al., Evolving Deep Neural Networks, pp. 18, Mar. 2017. (Year: 2017).*

Stanley et al., Evolving Neural Networks through Augmenting Topologies, Evolutionary Computation 10(2), pp. 99-127, 2002. (Year: 2002).*

Likothanassis et al., Optimizing the Structure of Neural Networks Using Evolution Techniques, Transactions on Information and Communications Technologies, vol. 15, 1997. (Year: 1997).*

Yin et al., "DE2: Dynamic Ensemble of Ensembles for Learning Nonstationary Data," Elsevier, Neurocomputing 165, Apr. 17, 2015, pp. 14 through 22.

Chen et al., "Towards Incremental Learning of Nonstationary Imbalanced Data Stream: A Multiple Selectively Recursive Approach," Springer, Evolving Systems, 2011, pp. 35 through 50.

Chandra, A. et al., "Evolutionary Framework for the Construction of Diverse Hybrid Ensembles," European Symposium on Artificial Neural Networks Bruges (Belgium), Apr. 27-29, 2005, 6 pages.

Zhou, Z. et al., "Ensembling neural networks: Many could be better than all," Artificial Intelligence 137, 2002, pp. 239 through 263.

Kourentzes, N. et al., "Neural network ensemble operators for time series forecasting," Expert Systems with Applications 41, 2014, pp. 4235 through 4244.

Opitz, D. et al., "Generating Accurate and Diverse Members of a Neural-Network Ensemble," Advances in Neural Information Processing Systems, 1996, pp. 535 through 541.

Fish, et al., "Using an artificial neural network trained with genetic algorithm to model brand share," Journal of Business Research 57, 2004, pp. 79-85.

Pellerin, Eric, et al., "Self-adaptive parameters in genetic algorithms", Proc. SPIE 5433, Data Mining and Knowledge Discovery: Theory, Tools, and Technology VI, (Apr. 12, 2004); doi: 10.1117/12.542156; http://dx.doi.org/10.1117/12.542156, 12 pgs.

Galaviz, Jose, et al., "A Self-Adaptive Genetic Algorithm for Function Optimization", IEEE, Nov. 1996, 6 pgs.

Lei, Wang, et al., "An improved adaptive genetic algorithm and its application to image segmentation", Proc. SPIE 4550, Image Extraction, Segmentation, and Recognition, (Sep. 21, 2001); doi: 10.1117/12.441434; http://dx.doi.org/10.1117/12.441434, 8 pgs.

Jakobovic, Domagoj, et al., "Adaptive Genetic Algorithm", Journal of Computing and Information Technology, CIT 7, 1999, 3, pp. 229-235.

Law, Nga L., et al., "Adaptive Genetic Algorithm with Mutation and Crossover Matrices", IJCAI-07, 2007, pp. 2330-2333.

* cited by examiner

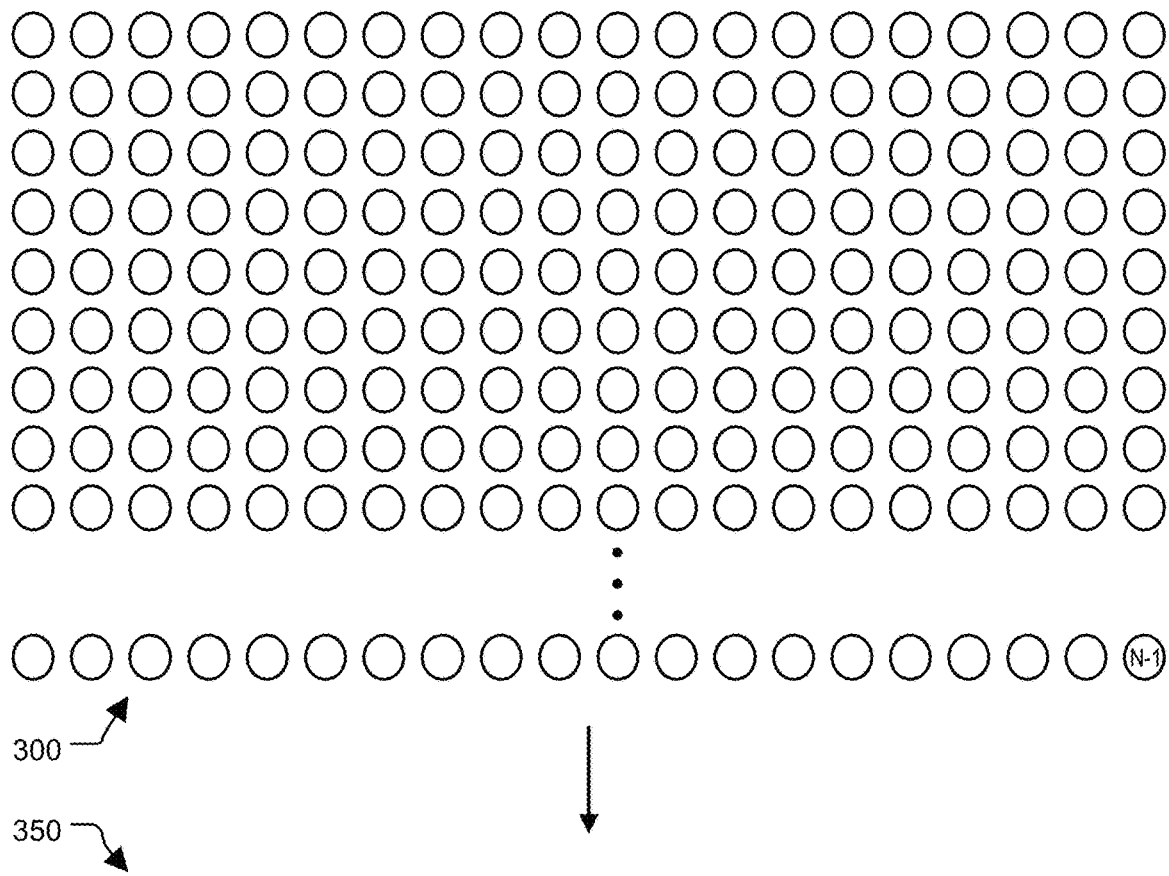
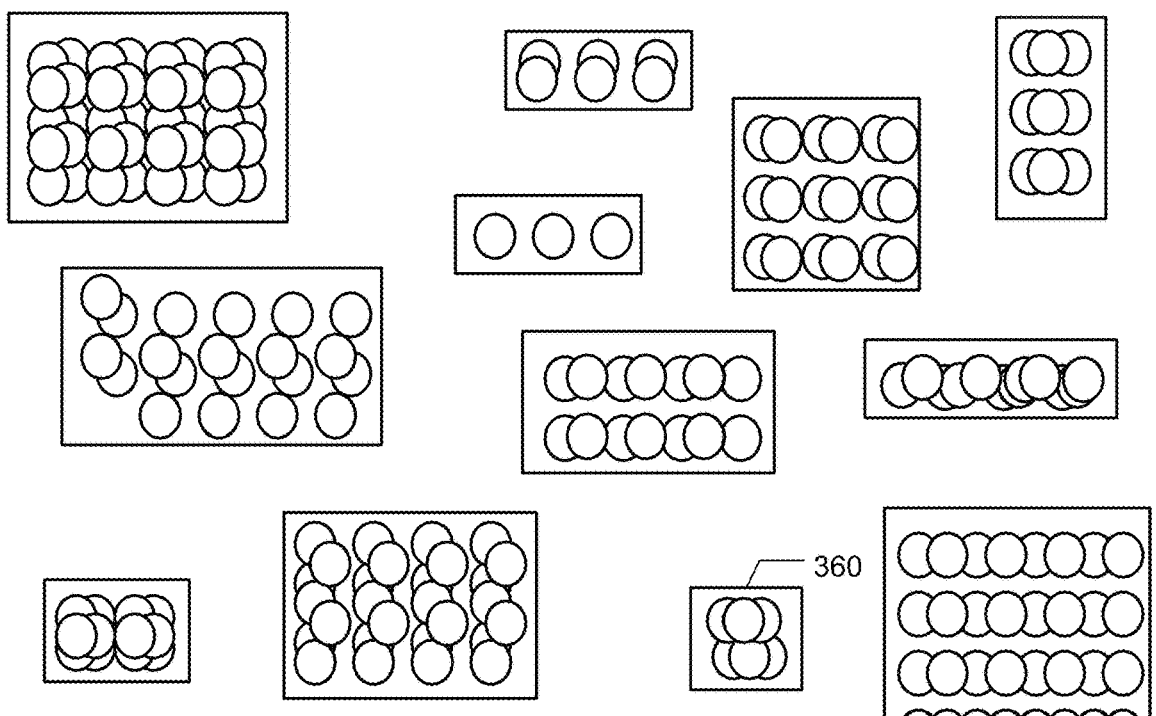
*FIG. 3*

Determine species fitness, identify "elite species," and remove stagnant species
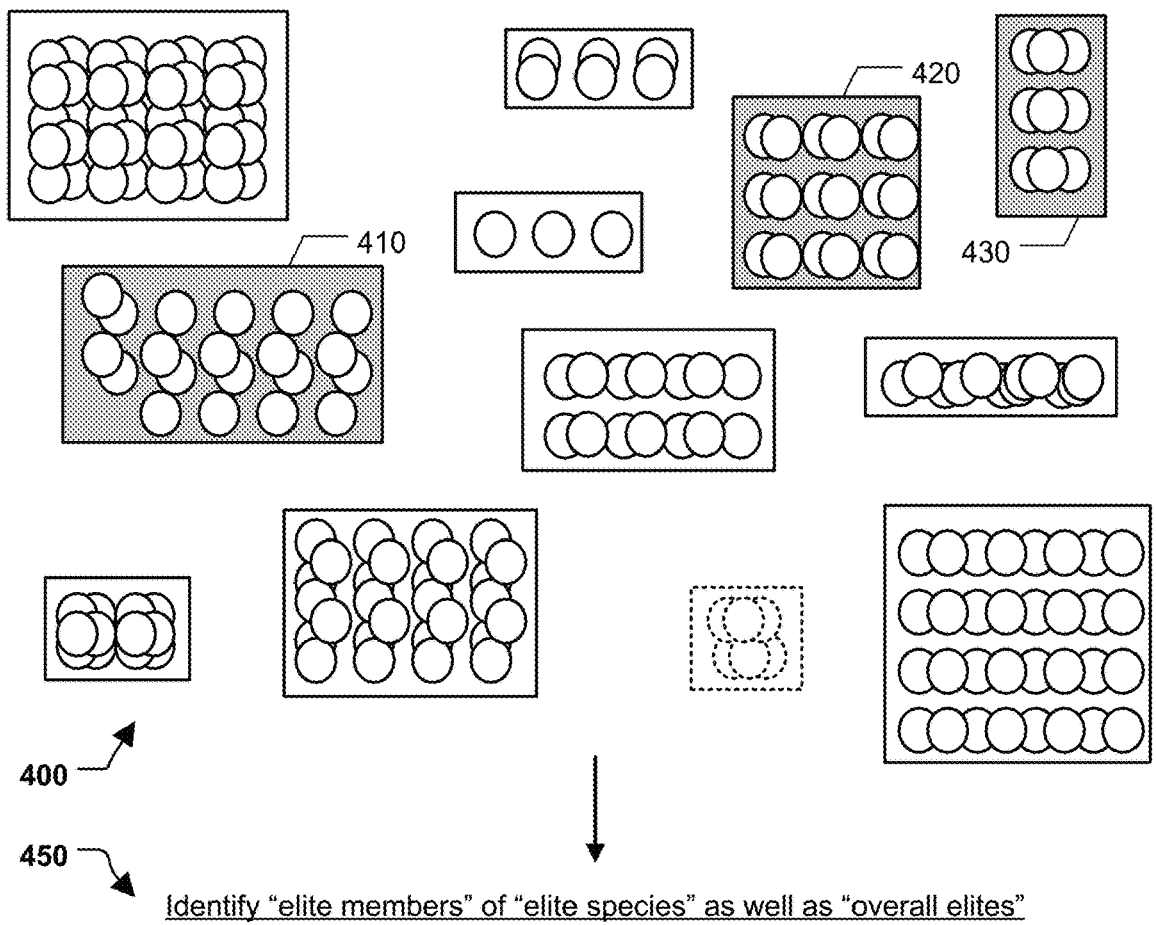
Identify "elite members" of "elite species" as well as "overall elites"
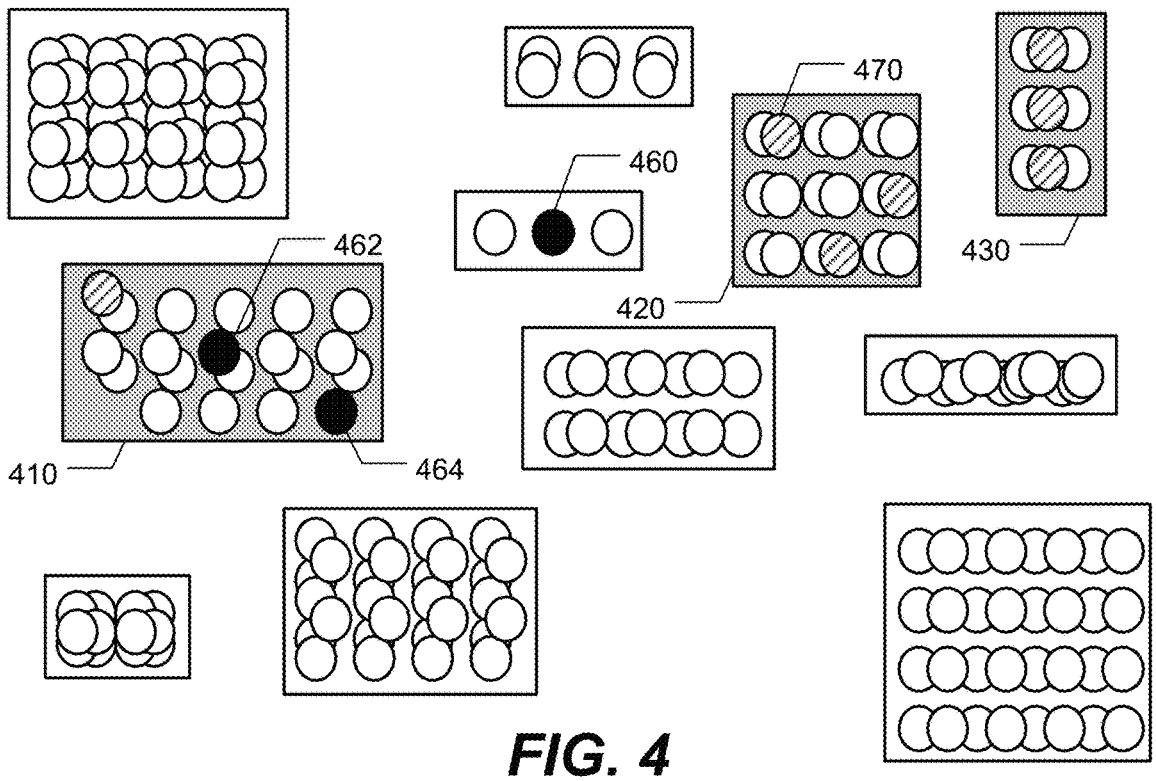
FIG. 4

First Epoch

| | # Nodes | Connections | Input Nodes | Hidden Layers | Fitness |
|---|---|---|---|---|---|
| Model 1 | 3 | 3 | 1 | 1 | 0.30 |
| Model 2 | 4 | 4 | 2 | 1 | 0.24 |
| ... | ... | ... | ... | ... | ... |
| Model N | 5 | 3 | 1 | 2 | 0.28 |
| Average | 4 | 3 | 1 | 1 | 0.26 |

First Evolutionary Weights

| Topological Parameter | Possible Mutation | Evolutionary Weight (e.g., Probability) |
|---|---|---|
| Nodes | Add Node(s) | 0.25 |
| Connections | Add Connection(s) | 0.25 |
| Input Nodes | Add Input Node(s) | 0.25 |
| Hidden Layers | Add Hidden Layer(s) | 0.25 |

Second Epoch

| | # Nodes | Connections | Input Nodes | Hidden Layers | Fitness |
|---|---|---|---|---|---|
| Model 1 | 3 | 4 | 1 | 1 | 0.24 |
| Model 2 | 5 | 4 | 3 | 2 | 0.39 |
| ... | ... | ... | ... | ... | ... |
| Model N | 4 | 3 | 2 | 3 | 0.37 |

Second Evolutionary Weights

| Topological Parameter | Possible Mutation | Evolutionary Weight (e.g., Probability) |
|---|---|---|
| Nodes | Add Node(s) | 0.25 |
| Connections | Add Connection(s) | 0.25 |
| Input Nodes | Add Input Node(s) | 0.30 |
| Hidden Layers | Add Hidden Layer(s) | 0.30 |

Third Epoch

|  | # Nodes | Connections | # Input Nodes | # Hidden Layers | Fitness |
|---|---|---|---|---|---|
| Model 1 | 8 | 7 | 3 | 3 | 0.24 |
| Model 2 | 9 | 9 | 1 | 2 | 0.26 |
| ... | ... | ... | ... | ... | ... |
| Model N | 7 | 8 | 2 | 3 | 0.22 |
| Average | 8 | 8 | 2 | 2 | 0.23 |

Third Evolutionary Weights

| Topological Parameter | Possible Mutation | Evolutionary Weight (e.g., Probability) |
|---|---|---|
| Nodes | Add Node(s) | 0.25 |
| Connections | Add Connection(s) | 0.25 |
| Input Nodes | Add Input Node(s) | 0.30 |
| Hidden Layers | Add Hidden Layer(s) | 0.30 |

Fourth Epoch

|  | # Nodes | Connections | # Input Nodes | # Hidden Layers | Fitness |
|---|---|---|---|---|---|
| Model 1 | 9 | 7 | 3 | 3 | 0.21 |
| Model 2 | 9 | 9 | 2 | 2 | 0.22 |
| ... | ... | ... | ... | ... | ... |
| Model N | 10 | 9 | 2 | 3 | 0.24 |

Fourth Evolutionary Weights

| Topological Parameter | Possible Mutation | Evolutionary Weight (e.g., Probability) |
|---|---|---|
| Nodes | Add Node(s) | 0.25 |
| Connections | Add Connection(s) | 0.25 |
| Input Nodes | Add Input Node(s) | 0.25 |
| Hidden Layers | Add Hidden Layer(s) | 0.25 |

1402
Generate, by a processor of a computing device, an output set of models corresponding to a first epoch of a genetic algorithm, the output set of models based on an input set of models of the first epoch, where each of the input set of models and the output set of models includes data representative of a neural network

1404
Determine a particular model of the output set of models based on a fitness function, where a first topological parameter of a first model of the input set of models is modified to generate the particular model of the output set of models

1406
Modify a probability that the first topological parameter is to be changed by a genetic operation during a second epoch of the genetic algorithm that is subsequent to the first epoch

1408
Generate a second output set of models corresponding to the second epoch, the second output set of models based on the output set of models and the modified probability

*FIG. 14*

EXECUTION OF A GENETIC ALGORITHM WITH VARIABLE EVOLUTIONARY WEIGHTS OF TOPOLOGICAL PARAMETERS FOR NEURAL NETWORK GENERATION AND TRAINING

BACKGROUND

Computers are often used to solve complex quantitative and qualitative problems. For problems that involve a large data set, a specially trained professional, known as a data scientist, is often hired. The data scientist interprets the data set and constructs models that can be processed by computers to solve the problem. However, hiring data scientists is cost prohibitive for many organizations.

For certain types of problems, advanced computing techniques, such as genetic algorithms or backpropagation, may be available to develop a model, such as a neural network, that is comparable in accuracy to a model that would be created by a data scientist. However, genetic algorithms may take a large number of iterations to converge on an acceptable neural network, and backpropagation may be slow when a large data set is being modeled or when the neural network includes a large number of nodes, connections, or layers. Additionally, backpropagation may result in "overfitting" (e.g., a neural network generated by backpropagation may model the specific data set used for training, but may not be "general" enough to model other data sets within particular tolerances).

Furthermore, various types of machine-learning problems exist. For example, regression problems involve evaluating a series of inputs to predict a numeric output, classification problems involve evaluating a series of inputs to predict a categorical output, and reinforcement learning involves performing actions within an environment to optimize some notion of a positive reward. Due to the differences in the various types of problems, the available mechanisms to generate and train a neural network or other machine learning solution may be problem-specific. For example, a support vector machine (SVM) may be suitable for some classification problems, linear regression may be suitable for some regression problems, and a specialized machine learning platform, such as TensorFlow, may be suitable for reinforcement learning or other numerical calculations. Although a SVM, linear regression, and specialized machine learning platforms may solve specific machine-learning problems, at least some of these mechanisms may not be particularly suited to training neural networks. Thus, generating and training neural networks that meet performance requirements for each of multiple types of problems faced by an enterprise may be slow and difficult.

SUMMARY

The present application describes automated model building systems and methods that utilize a genetic algorithm having variable topological parameters to generate and train a neural network in a manner that is applicable to multiple types of machine-learning problems. To illustrate, the described automated model building techniques may enable a generalized approach to generating neural networks that can be applied for regression, classification, and reinforcement learning problems. Execution of the genetic algorithm may include varying a probability that a particular topological parameter will change (e.g., mutate) in a particular way in a particular generation based on one or more heuristics associated with the particular generation and a previous generation. For example, if a change in the particular topological parameter is associated with an increase in accuracy (as compared to other models of the same species), the probability that the particular topological parameter will mutate in the particular generation may be increased (or if the change in the particular topological parameter is associated with a decrease in accuracy, the probability may be decreased). Varying the probability that topological parameters may change from generation to generation based on heuristics may enable generating a neural network that models a particular data set with acceptable accuracy and in less time than using genetic algorithms having a fixed probability that topological parameters may change from generation to generation.

As an illustrative, non-limiting example, consider a home with four temperature sensors that periodically collect temperature readings in the living room (L), the dining room (D), the master bedroom (M), and the guest bedroom (G), respectively. In this example, a data set may include four columns, where each column corresponds to temperature readings from a particular sensor in a particular room, and where each row corresponds to a particular time at which the four sensors took a temperature reading. It may be of interest to predict the temperature in one of the rooms, e.g., L, given the temperature in the other three rooms, e.g., D, M, and G. A neural network may be suitable for such a problem, where the neural network has D, M, and/or G as input nodes and L as an output node. For example, a neural network that predicts an output value of L with 90% accuracy given input values of D, M, and/or G may be an acceptable solution.

In accordance with the described techniques, a genetic algorithm may be executed to generate and train a neural network. Genetic algorithms are iterative adaptive search heuristics inspired by biological natural selection. The genetic algorithm may start with a population of random models that each define a neural network with different topology, weights and activation functions. Over the course of several epochs (also known as generations), the models may be evolved using biology-inspired reproduction operations, such as crossover (e.g., combining characteristics of two neural networks), mutation (e.g., randomly modifying a characteristic of a neural network), stagnation/extinction (e.g., removing neural networks whose accuracy has not improved in several epochs), and selection (e.g., identifying the best performing neural networks via testing). For at least some epochs, the probability of a particular mutation of a particular topological parameter (referred to herein as an evolutionary weight associated with the particular mutation of the particular topological parameter) for a particular epoch may be modified (e.g., from an initial value or value from a previous epoch) based on heuristics, such as metrics associated with one or more models of one or more previous epochs. Varying evolutionary weights of particular mutations of particular topological parameters from epoch to epoch may cause the genetic algorithm to converge (e.g., to generate a neural network that models a particular data set with acceptable accuracy) in less time, may improve the fitness of a neural network that is output by the genetic algorithm, or both, than if the evolutionary weights of mutations of topological parameters are fixed from epoch to epoch.

In addition, the best performing models of an epoch may be selected for reproduction to generate a trainable model. The trainable model may be trained using backpropagation to generate a trained model. Although described as backpropagation training, any combination of a genetic algorithm and an optimization algorithm such as backpropagation, a derivative free optimizer (DFO), an extreme learning machine (ELM) or similar optimizer may be used to generate and then train a neural network. It is to be understood that characterization of any system components of method steps as "optimizers" or "optimization trainers," and use of such terminology herein, is not to be interpreted as requiring such components or steps to generate optimal results to the extreme (e.g., 100% prediction or classification accuracy). Rather, use of such terms is to be interpreted as indicating an attempt to generate an output that is improved in some fashion relative to an input. For example, an optimization trainer that receives a trainable model as input and outputs a trained model may attempt to improve a prediction or classification accuracy of the trainable model by modifying one or more attributes of the trainable model to generate the trained model. When the trained model is available, the trained model may be re-inserted into the genetic algorithm for continued evolution. Training a model that is generated by breeding the best performing population members of an epoch may serve to reinforce desired "genetic traits" (e.g., neural network topology, activation functions, connection weights, etc.), and introducing the trained model back into the genetic algorithm may lead the genetic algorithm to converge to an acceptably accurate solution (e.g., neural network) faster, for example because desired "genetic traits" are available for inheritance in later epochs of the genetic algorithm.

A computer system in accordance with the present disclosure may include a memory that stores an input data set and a first plurality of data structures. For example, each data structure may be a model of a neural network that models the input data set. The computer system may also include at least one processor that is configured to execute a recursive search. For example, the recursive search may be a genetic algorithm to generate a neural network that best models the input data set. During a first iteration of the recursive search, the processor may determine a fitness value for each of the data structures (e.g., neural network models) of the first plurality of data structures based on at least a subset of the input data set. During a second iteration of the recursive search, the processor may generate a second plurality of data structures based on the first plurality of data structures and determine a fitness value for each of the second plurality of data structures based on at least the subset of the input data set. The processor may also compare the fitness values of each of the second plurality of data structures to the fitness values of each of the first plurality of data structures to determine a particular data structure of the second plurality of data structures. The processor may determine a difference in at least one topological parameter between the particular data structure of the second plurality of data structures and a parent data structure of the first plurality of data structures. The processor may also modify a probability that the at least one topological parameter is to be changed during a third iteration of the recursive search. During a third iteration, the processor may generate a third plurality of data structures based at least in part on the modified probability. In a particular implementation, the at least one topological parameter includes a number of nodes, a number of connections, connection weights, an activation function, or any combination thereof.

BRIEF DESCRIPTION OF THE DRAWINGS

FIG. 3 illustrates particular examples of first and second stages of operation at the system of FIG. 1;

FIG. 4 illustrates particular examples of third and fourth stages of operation at the system of FIG. 1;

FIG. 11 illustrates a third example of varying evolutionary weights based on one or more metrics;

FIG. 12 illustrates a fourth example of varying evolutionary weights based on one or more metrics;

FIG. 14 illustrates a particular example of a method of execution of a genetic algorithm having variable probabilities of changing topological parameters.

DETAILED DESCRIPTION

Figure 1:
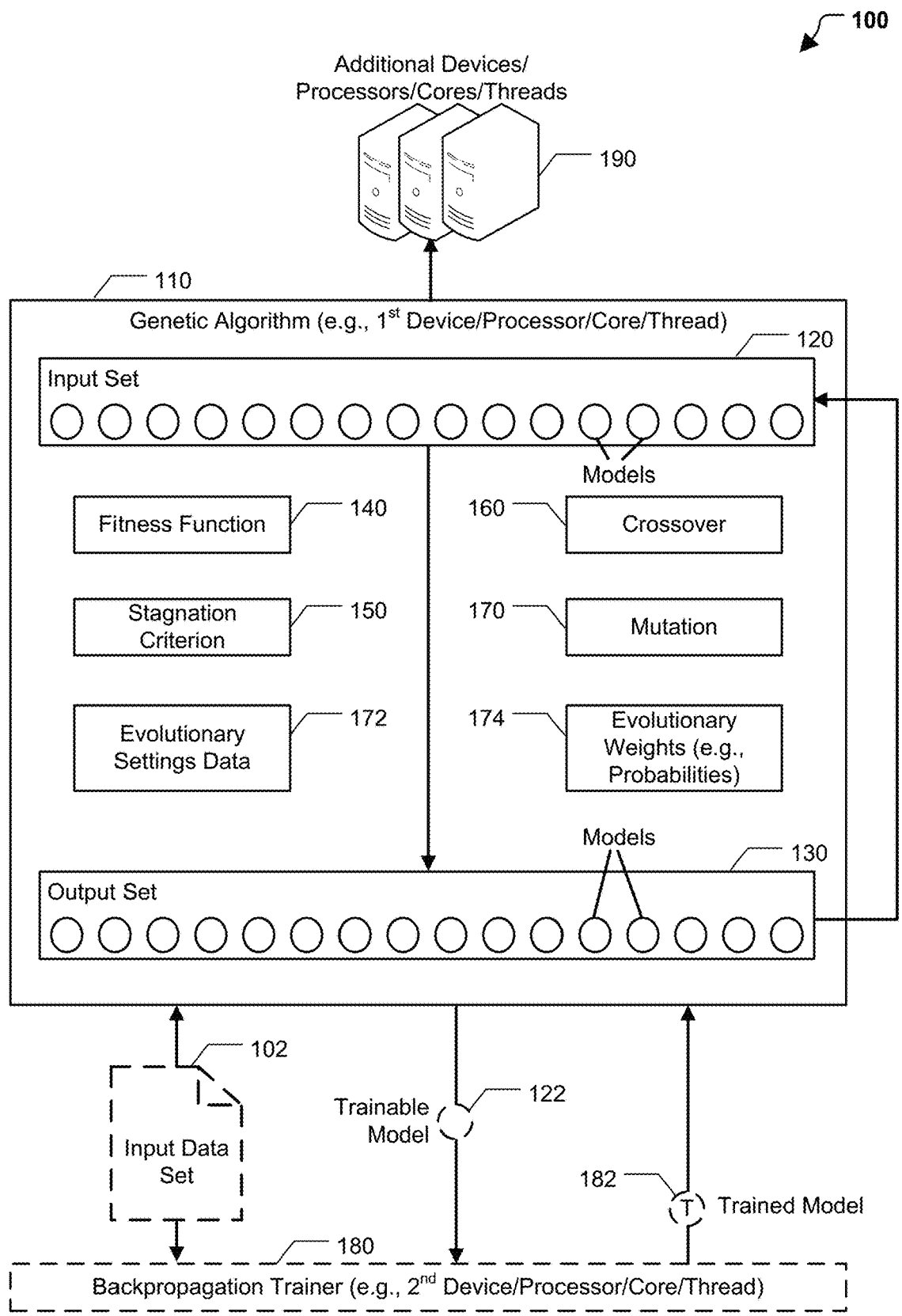
FIG. 1 illustrates a particular example of a system that is operable to support cooperative execution of a genetic algorithm having variable evolutionary weights of topological parameters and a backpropagation trainer.

Referring to FIG. 1, a particular illustrative example of a system 100 is shown. The system 100, or portions thereof, may be implemented using (e.g., executed by) one or more computing devices, such as laptop computers, desktop computers, mobile devices, servers, and Internet of Things devices and other devices utilizing embedded processors and firmware or operating systems, etc. In the illustrated example, the system 100 includes a genetic algorithm 110. In some implementations, the system 100 further includes a backpropagation trainer 180. In other implementations, the system 100 does not include the backpropagation trainer 180. The backpropagation trainer 180 is an example of an optimization trainer, and other examples of optimization trainers that may be used in conjunction with the described techniques include, but are not limited to, a derivative free optimizer (DFO), an extreme learning machine (ELM), etc.

It is to be understood that operations described herein as being performed by the genetic algorithm 110 or the backpropagation trainer 180 may be performed by a device executing the genetic algorithm 110 or the backpropagation trainer 180. In particular aspects, the genetic algorithm 110 is executed on a different device, processor (e.g., central processor unit (CPU), graphics processing unit (GPU) or other type of processor), processor core, and/or thread (e.g., hardware or software thread) than the backpropagation trainer 180. Moreover, execution of certain operations associated with the genetic algorithm 110 or the backpropagation trainer 180 may be parallelized, as further described herein.

The genetic algorithm 110 may automatically generate a neural network model of a particular data set, such as an illustrative input data set 102. The system 100 may provide an automated model building process that enables even inexperienced users to quickly and easily build highly accurate models based on a specified data set. Additionally, the system 100 may simplify the neural network model to avoid overfitting and to reduce computing resources required to run the model. Additionally, probabilities of changing particular topological parameters of models generated during epochs of the genetic algorithm 110 may be varied from epoch to epoch based on metrics, such as fitness values, associated with models of a previous epoch. Changing the probabilities that particular topological parameters may change may improve the efficiency of the system 100 by increasing a likelihood that particular topological parameter modifications that improve fitness are performed during the model building process, thereby improving the speed with which the genetic algorithm converges and improving the fitness of models that are output by the model building process.

The genetic algorithm 110 includes or is otherwise associated with a fitness function 140, a stagnation criterion 150, a crossover operation 160, a mutation operation 170, evolutionary settings data 172, and evolutionary weights 174 (e.g., probabilities) associated with changing one or more topological parameters of models generated during epochs of the genetic algorithm 110. As described above, the genetic algorithm 110 may represent a recursive neuroevolutionary search process. During each iteration of the search process (also called an "epoch" or a "generation" of the genetic algorithm 110), an input set (or population) 120 may be "evolved" to generate an output set (or population) 130. The input set 120 of an initial epoch of the genetic algorithm 110 may be randomly or pseudo-randomly generated. After that, the output set 130 of one epoch may be the input set 120 of the next (non-initial) epoch, as further described herein.

The input set 120 and the output set 130 may each include a plurality of models, where each model includes data representative of a neural network. For example, each model may specify a neural network by at least a neural network topology, a series of activation functions, and connection weights. The topology of a neural network may include a configuration of nodes of the neural network and connections between such nodes. The models may also be specified to include other parameters, including but not limited to bias values/functions and aggregation functions.

Figure 2:
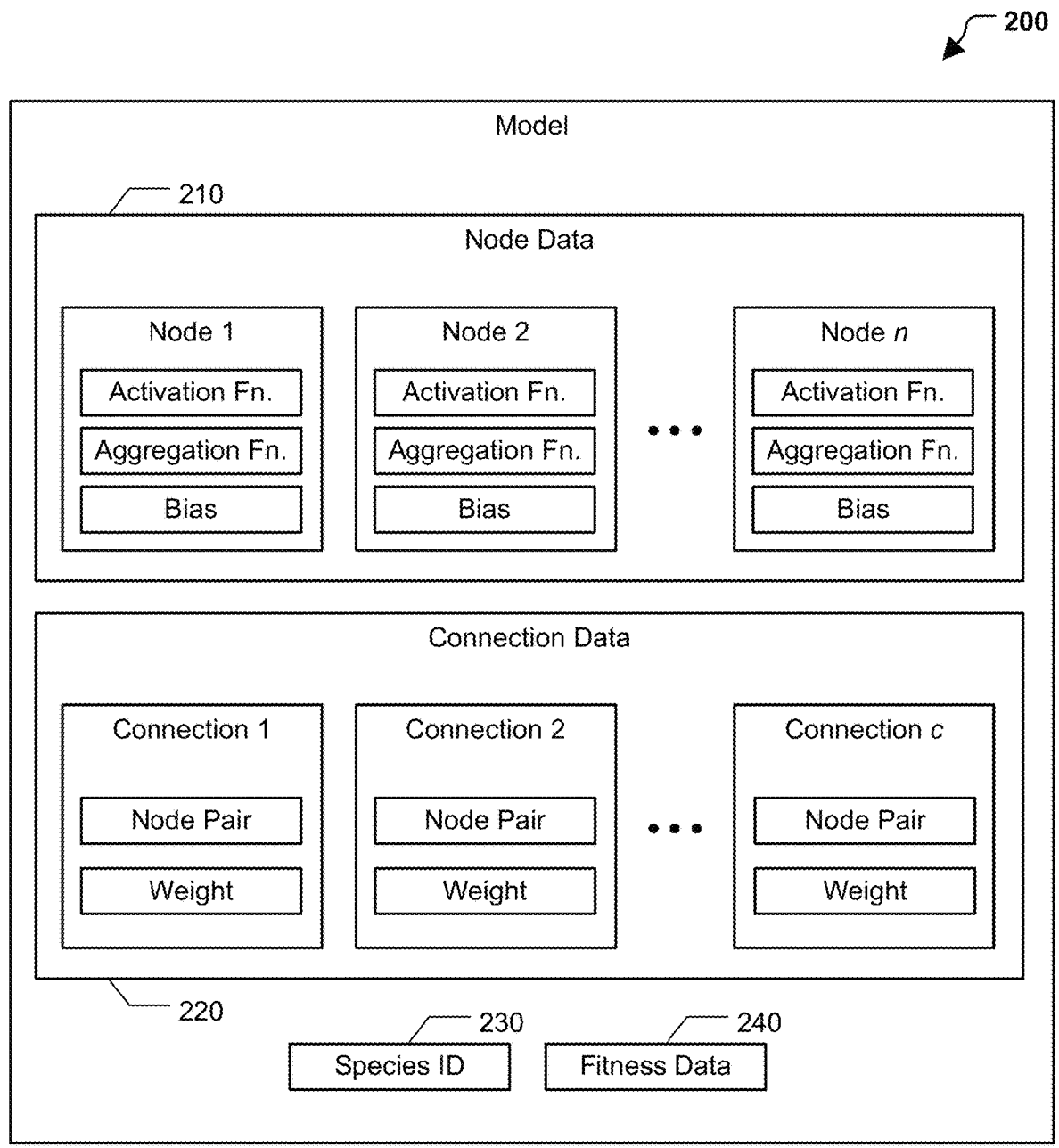
FIG. 2 illustrates a particular example of a model including data representative of a neural network.

Additional examples of neural network models are further described with reference to FIG. 2. In particular, as shown in FIG. 2, a model 200 may be a data structure that includes node data 210 and connection data 220. In the illustrated example, the node data 210 for each node of a neural network may include at least one of an activation function, an aggregation function, or a bias (e.g., a constant bias value or a bias function). The activation function of a node may be a step function, sine function, continuous or piecewise linear function, sigmoid function, hyperbolic tangent function, or other type of mathematical function that represents a threshold at which the node is activated. The biological analog to activation of a node is the firing of a neuron. The aggregation function may be a mathematical function that combines (e.g., sum, product, etc.) input signals to the node. An output of the aggregation function may be used as input to the activation function. The bias may be a constant value or function that is used by the aggregation function and/or the activation function to make the node more or less likely to be activated.

The connection data 220 for each connection in a neural network may include at least one of a node pair or a connection weight. For example, if a neural network includes a connection from node N1 to node N2, then the connection data 220 for that connection may include the node pair <N1, N2>. The connection weight may be a numerical quantity that influences if and/or how the output of N1 is modified before being input at N2. In the example of a recurrent network, a node may have a connection to itself (e.g., the connection data 220 may include the node pair <N1, N1>).

The model 200 may also include a species identifier (ID) 230 and fitness data 240. The species ID 230 may indicate which of a plurality of species the model 200 is classified in, as further described with reference to FIG. 3. The fitness data 240 may indicate how well the model 200 models the input data set 102. For example, the fitness data 240 may include a fitness value that is determined based on evaluating the fitness function 140 with respect to the model 200, as further described herein.

Returning to FIG. 1, the fitness function 140 may be an objective function that can be used to compare the models of the input set 120. In some examples, the fitness function 140 is based on a frequency and/or magnitude of errors produced by testing a model on the input data set 102. As a simple example, assume the input data set 102 includes ten rows, that the input data set 102 includes two columns denoted A and B, and that the models illustrated in FIG. 1 represent neural networks that output a predicted value of B given an input value of A. In this example, testing a model may include inputting each of the ten values of A from the input data set 102, comparing the predicted values of B to the corresponding actual values of B from the input data set 102, and determining if and/or by how much the two predicted and actual values of B differ. To illustrate, if a particular neural network correctly predicted the value of B for nine of the ten rows, then a relatively simple fitness function (e.g., the fitness function 140) may assign the corresponding model a fitness value of 9/10=0.9. It is to be understood that the previous example is for illustration only and is not to be considered limiting. In some aspects, the fitness function 140 may be based on factors unrelated to error frequency or error rate, such as number of input nodes, node layers, hidden layers, connections, computational complexity, etc.

In a particular aspect, fitness evaluation of models may be performed in parallel. To illustrate, the system 100 may include additional devices, processors, cores, and/or threads 190 to those that execute the genetic algorithm 110 and the backpropagation trainer 180. These additional devices, processors, cores, and/or threads 190 may test model fitness in parallel based on the input data set 102 and may provide the resulting fitness values to the genetic algorithm 110.

In a particular aspect, the genetic algorithm 110 may be configured to perform speciation. For example, the genetic algorithm 110 may be configured to cluster the models of the input set 120 into species based on "genetic distance" between the models. Because each model represents a neural network, the genetic distance between two models may be based on differences in nodes, activation functions, aggregation functions, connections, connection weights, etc. of the two models. In an illustrative example, the genetic algorithm 110 may be configured to serialize a model into a bit string. In this example, the genetic distance between models may be represented by the number of differing bits in the bit strings corresponding to the models. The bit strings corresponding to models may be referred to as "encodings" of the models. Speciation is further described with reference to FIG. 3.

Because the genetic algorithm 110 is configured to mimic biological evolution and principles of natural selection, it may be possible for a species of models to become "extinct."

The stagnation criterion 150 may be used to determine when a species should become extinct, e.g., when the models in the species are to be removed from the genetic algorithm 110. Stagnation is further described with reference to FIG. 4.

The crossover operation 160 and the mutation operation 170 is highly stochastic under certain constraints and a defined set of probabilities optimized for model building, which produces reproduction operations that can be used to generate the output set 130, or at least a portion thereof, from the input set 120. In a particular aspect, the genetic algorithm 110 utilizes intra-species reproduction but not inter-species reproduction in generating the output set 130. Including intra-species reproduction and excluding inter-species reproduction may be based on the assumption that because they share more genetic traits, the models of a species are more likely to cooperate and will therefore more quickly converge on a sufficiently accurate neural network. In some examples, inter-species reproduction may be used in addition to or instead of intra-species reproduction to generate the output set 130. Crossover and mutation are further described with reference to FIG. 6.

Left alone and given time to execute enough epochs, the genetic algorithm 110 may be capable of generating a model (and by extension, a neural network) that meets desired accuracy requirements. However, because genetic algorithms utilize randomized selection, it may be overly time-consuming for a genetic algorithm to arrive at an acceptable neural network. To illustrate, it may be possible for the "traits" of an unreliable neural network to survive for several epochs of the genetic algorithm 110, which may delay convergence of the genetic algorithm 110 on a reliable and accurate neural network that models the input data set 102. In accordance with the present disclosure, to "help" the genetic algorithm 110 arrive at a solution faster and to improve the accuracy of the models that are output by the genetic algorithm 110, the evolutionary weights 174 (e.g., probabilities) that one or more topological parameters may change (e.g., due to a genetic operation, such as the mutation operation 170) may vary for different epochs in accordance with the evolutionary settings data 172. For example, a probability that a genetic operation may change a particular topological parameter during generation of the output set 130 may be modified based one or more metrics, such as fitness values (e.g., based on the fitness function 140) associated with the input set 120 and the output set of a previous epoch. As used herein, the topological parameters may include a number of nodes, a number of connections, a number of input nodes, a number of hidden layers, other parameters indicative of a topology of a neural network, or any combination thereof. In some implementations, probabilities that other parameters change may be similarly modified, as further described herein.

To illustrate, during a previous epoch of the genetic algorithm, genetic operations may cause different topological parameters to change from models of an input set to models of an output set (which is provided as the input set 120 to a particular epoch), and each change may be associated with a corresponding change in fitness. If modifying a particular topological parameter corresponds to a larger improvement in fitness than other modifications (or an improvement that satisfies a threshold), the evolutionary weights 174 may be modified such that the probability that genetic operations during the particular epoch modify the particular topological parameter is increased. By increasing the probability of relatively successful modifications, traits that are associated with more successful models may be identified faster, which may increase the speed with which the genetic algorithm 110 converges to an "acceptable result". Additionally, the traits that are associated with more successful models may be propagated to the output of the genetic algorithm 110, which may improve the fitness of the output of the genetic algorithm 110. Additional details regarding varying the evolutionary weights 174 are further described herein.

In some implementations, to "help" the genetic algorithm 110 arrive at a solution faster, a model may occasionally be sent from the genetic algorithm 110 to the backpropagation trainer 180 for training. This model is referred to herein as a trainable model 122. In particular, the trainable model 122 may be based on crossing over and/or mutating the fittest models of the input set 120, as further described with reference to FIG. 5. Thus, the trainable model 122 may not merely be a genetically "trained" file produced by the genetic algorithm 110. Rather, the trainable model 122 may represent an advancement with respect to the fittest models of the input set 120.

The backpropagation trainer 180 may utilize a portion, but not all of the input data set 102 to train the connection weights of the trainable model 122, thereby generating a trained model 182. For example, the portion of the input data set 102 may be input into the trainable model 122, which may in turn generate output data. The input data set 102 and the output data may be used to determine an error value, and the error value may be used to modify connection weights of the model, such as by using gradient descent or another function.

The backpropagation trainer 180 may train using a portion rather than all of the input data set 102 to mitigate overfitting concerns and/or to shorten training time. The backpropagation trainer 180 may leave aspects of the trainable model 122 other than connection weights (e.g., neural network topology, activation functions, etc.) unchanged. Backpropagating a portion of the input data set 102 through the trainable model 122 may serve to positively reinforce "genetic traits" of the fittest models in the input set 120 that were used to generate the trainable model 122. Because the backpropagation trainer 180 may be executed on a different device, processor, core, and/or thread than the genetic algorithm 110, the genetic algorithm 110 may continue executing additional epoch(s) while the connection weights of the trainable model 122 are being trained. When training is complete, the trained model 182 may be input back into (a subsequent epoch of) the genetic algorithm 110, so that the positively reinforced "genetic traits" of the trained model 182 are available to be inherited by other models in the genetic algorithm 110. Use of the backpropagation trainer 180 is optional and is not intended to be limiting.

Operation of the system 100 is now described with reference to FIGS. 3-12. It is to be understood, however, that in alternative implementations certain operations may be performed in a different order than described. Moreover, operations described as sequential may be instead be performed at least partially concurrently, and operations described as being performed at least partially concurrently may instead be performed sequentially.

During a configuration stage of operation, a user may specify the input data set 102 and may specify a particular data field or a set of data fields in the input data set 102 to be modeled. The data field(s) to be modeled may correspond to output nodes of a neural network that is to be generated by the system 100. For example, if a user indicates that the value of a particular data field is to be modeled (e.g., to predict the value based on other data of the data set), the model may be generated by the system 100 to include an output node that generates an output value corresponding to a modeled value of the particular data field. In particular implementations, the user can also configure other aspects of the model. For example, the user may provide input to indicate a particular data field of the data set that is to be included in the model or a particular data field of the data set that is to be omitted from the model. As another example, the user may provide input to constrain allowed model topologies. To illustrate, the model may be constrained to include no more than a specified number of input nodes, no more than a specified number of hidden layers, or no recurrent loops.

Further, in particular implementations, the user can configure aspects of the genetic algorithm 110. For example, the user may provide input to limit a number of epochs that will be executed by the genetic algorithm 110. Alternatively, the user may specify a time limit indicating an amount of time that the genetic algorithm 110 has to generate the model, and the genetic algorithm 110 may determine a number of epochs that will be executed based on the specified time limit. To illustrate, an initial epoch of the genetic algorithm 110 may be timed (e.g., using a hardware or software timer at the computing device executing the genetic algorithm 110), and a total number of epochs that are to be executed within the specified time limit may be determined accordingly. As another example, the user may constrain a number of models evaluated in each epoch, for example by constraining the size of the input set 120 and/or the output set 130. As yet another example, the user can define a number of trainable models 122 to be trained by the backpropagation trainer 180 and fed back into the genetic algorithm 110 as trained models 182. As yet another example, the user can define a threshold to be used to determine whether to modify the evolutionary weights 174, the user can define one or more initial (e.g., default) values for the evolutionary weights 174 (which may be indicated by the evolutionary settings data 172), or a combination thereof. As yet another example, the user can constrain which topological parameters (or other parameters) may be modified by genetic operations.

In particular aspects, configuration of the genetic algorithm 110 also includes performing pre-processing steps based on the input data set 102. For example, the system 100 may determine, based on the input data set 102 and/or user input, whether a neural network is to be generated for a regression problem, a classification problem, a reinforcement learning problem, etc. As another example, the input data set 102 may be "cleaned" to remove obvious errors, fill in data "blanks," etc. As another example, values in the input data set 102 may be scaled (e.g., to values between 0 and 1). As yet another example, non-numerical data (e.g., categorical classification data or Boolean data) may be converted into numerical data.

After the above-described configuration stage, the genetic algorithm 110 may automatically generate an initial set of models based on the input data set 102, received user input indicating (or usable to determine) the type of problem to be solved, etc. (e.g., the initial set of models is data-driven). As illustrated in FIG. 2, each model may be specified by at least a neural network topology, an activation function, and link weights. The neural network topology may indicate an arrangement of nodes (e.g., neurons). For example, the neural network topology may indicate a number of input nodes, a number of hidden layers, a number of nodes per hidden layer, and a number of output nodes. The neural network topology may also indicate the interconnections (e.g., axons or links) between nodes.

The initial set of models may be input into an initial epoch of the genetic algorithm 110 as the input set 120, and at the end of the initial epoch, the output set 130 generated during the initial epoch may become the input set 120 of the next epoch of the genetic algorithm 110. In some examples, the input set 120 may have a specific number of models. For example, as shown in a first stage 300 of operation in FIG. 3, the input set may include 200 models. It is to be understood that alternative examples may include a different number of models in the input set 120 and/or the output set 130.

For the initial epoch of the genetic algorithm 110, the topologies of the models in the input set 120 may be randomly or pseudo-randomly generated within constraints specified by any previously input configuration settings. For example, the evolutionary weights 174 may be set to one or more initial (e.g., default or preset) values, and thus various topological parameters may be randomly or pseudo-randomly set to initial values (e.g., to generate the input set 120). Accordingly, the input set 120 may include models with multiple distinct topologies. For example, a first model may have a first topology (e.g., the topological parameters of the first model may have a first set of values), including a first number of input nodes associated with a first set of data parameters, a first number of hidden layers including a first number and arrangement of hidden nodes, one or more output nodes, and a first set of interconnections between the nodes. In this example, a second model may have a second topology (e.g., the topological parameters of the second model may have a second set of values), including a second number of input nodes associated with a second set of data parameters, a second number of hidden layers including a second number and arrangement of hidden nodes, one or more output nodes, and a second set of interconnections between the nodes. Since the first model and the second model are both attempting to model the same data field(s), the first and second models have the same output nodes.

The genetic algorithm 110 may automatically assign an activation function, an aggregation function, a bias, connection weights, etc. to each model of the input set 120 for the initial epoch. In some aspects, the connection weights are assigned randomly or pseudo-randomly. In some implementations, a single activation function is used for each node of a particular model. For example, a sigmoid function may be used as the activation function of each node of the particular model. The single activation function may be selected based on configuration data. For example, the configuration data may indicate that a hyperbolic tangent activation function is to be used or that a sigmoid activation function is to be used. Alternatively, the activation function may be randomly or pseudo-randomly selected from a set of allowed activation functions, and different nodes of a model may have different types of activation functions. In other implementations, the activation function assigned to each node may be randomly or pseudo-randomly selected (from the set of allowed activation functions) for each node the particular model. Aggregation functions may similarly be randomly or pseudo-randomly assigned for the models in the input set 120 of the initial epoch. Thus, the models of the input set 120 of the initial epoch may have different topologies (which may include different input nodes corresponding to different input data fields if the data set includes many data fields) and different connection weights. Further, the models of the input set 120 of the initial epoch may include nodes having different activation functions, aggregation functions, and/or bias values/functions.

Continuing to a second stage 350 of operation, each model of the input set 120 may be tested based on the input data set 102 to determine model fitness. For example, the input data set 102 may be provided as input data to each model, which processes the input data set (according to the network topology, connection weights, activation function, etc., of the respective model) to generate output data. The output data of each model may be evaluated using the fitness function 140 to determine how well the model modeled the input data set 102. For example, in the case of a regression problem, the output data may be evaluated by comparing a prediction value in the output data to an actual value in the input data set 102. As another example, in the case of a classification problem, a classifier result indicated by the output data may be compared to a classification associated with the input data set 102 to determine if the classifier result matches the classification in the input data set 102. As yet another example, in the case of a reinforcement learning problem, a reward may be determined (e.g., calculated) based on evaluation of an environment, which may include one or more variables, functions, etc. In a reinforcement learning problem, the fitness function 140 may be the same as or may be based on the reward function(s). Fitness of a model may be evaluated based on performance (e.g., accuracy) of the model, complexity (or sparsity) of the model, or a combination thereof. As a simple example, in the case of a regression problem or reinforcement learning problem, a fitness value may be assigned to a particular model based on an error value associated with the output data of that model or based on the value of the reward function, respectively. As another example, in the case of a classification problem, the fitness value may be assigned based on whether a classification determined by a particular model is a correct classification, or how many correct or incorrect classifications were determined by the model.

In a more complex example, the fitness value may be assigned to a particular model based on both prediction/classification accuracy or reward optimization as well as complexity (or sparsity) of the model. As an illustrative example, a first model may model the data set well (e.g., may generate output data or an output classification with a relatively small error, or may generate a large positive reward function value) using five input nodes (corresponding to five input data fields), whereas a second potential model may also model the data set well using two input nodes (corresponding to two input data fields), and thus the first model and the second model may have different values for at least one topological parameter (e.g., a number of input nodes, as a non-limiting example). In this illustrative example, the second model may be sparser (depending on the configuration of hidden nodes of each network model) and therefore may be assigned a higher fitness value that the first model.

As shown in FIG. 3, the second stage 350 may include clustering the models into species based on genetic distance. In a particular aspect, the species ID 230 of each of the models may be set to a value corresponding to the species that the model has been clustered into.

Continuing to FIG. 4, during a third stage 400 and a fourth stage 450 of operation, a species fitness may be determined for each of the species. The species fitness of a species may be a function of the fitness of one or more of the individual models in the species. As a simple illustrative example, the species fitness of a species may be the average of the fitness of the individual models in the species. As another example, the species fitness of a species may be equal to the fitness of the fittest or least fit individual model in the species. In alternative examples, other mathematical functions may be used to determine species fitness. The genetic algorithm 110 may maintain a data structure that tracks the fitness of each species across multiple epochs. Based on the species fitness, the genetic algorithm 110 may identify the "fittest" species, shaded and denoted in FIG. 4 as "elite species." Although three elite species 410, 420, and 430 are shown in FIG. 4, it is to be understood that in alternate examples a different number of elite species may be identified.

In a particular aspect, the genetic algorithm 110 uses species fitness to determine if a species has become stagnant and is therefore to become extinct. As an illustrative non-limiting example, the stagnation criterion 150 may indicate that a species has become stagnant if the fitness of that species remains within a particular range (e.g., +/−5%) for a particular number (e.g., 5) epochs. If a species satisfies a stagnation criterion, the species and all underlying models may be removed from the genetic algorithm 110. In the illustrated example, species 360 of FIG. 3 is removed, as shown in the third stage 400 through the use of broken lines.

Proceeding to the fourth stage 450, the fittest models of each "elite species" may be identified. The fittest models overall may also be identified. In the illustrated example, the three fittest models of each "elite species" are denoted "elite members" and shown using a hatch pattern. Thus, model 470 is an "elite member" of the "elite species" 420. The three fittest models overall are denoted "overall elites" and are shown using black circles. Thus, models 460, 462, and 464 are the "overall elites" in the illustrated example. As shown in FIG. 4 with respect to the model 460, an "overall elite" need not be an "elite member," e.g., may come from a non-elite species. In an alternate implementation, a different number of "elite members" per species and/or a different number of "overall elites" may be identified.

Figure 5:
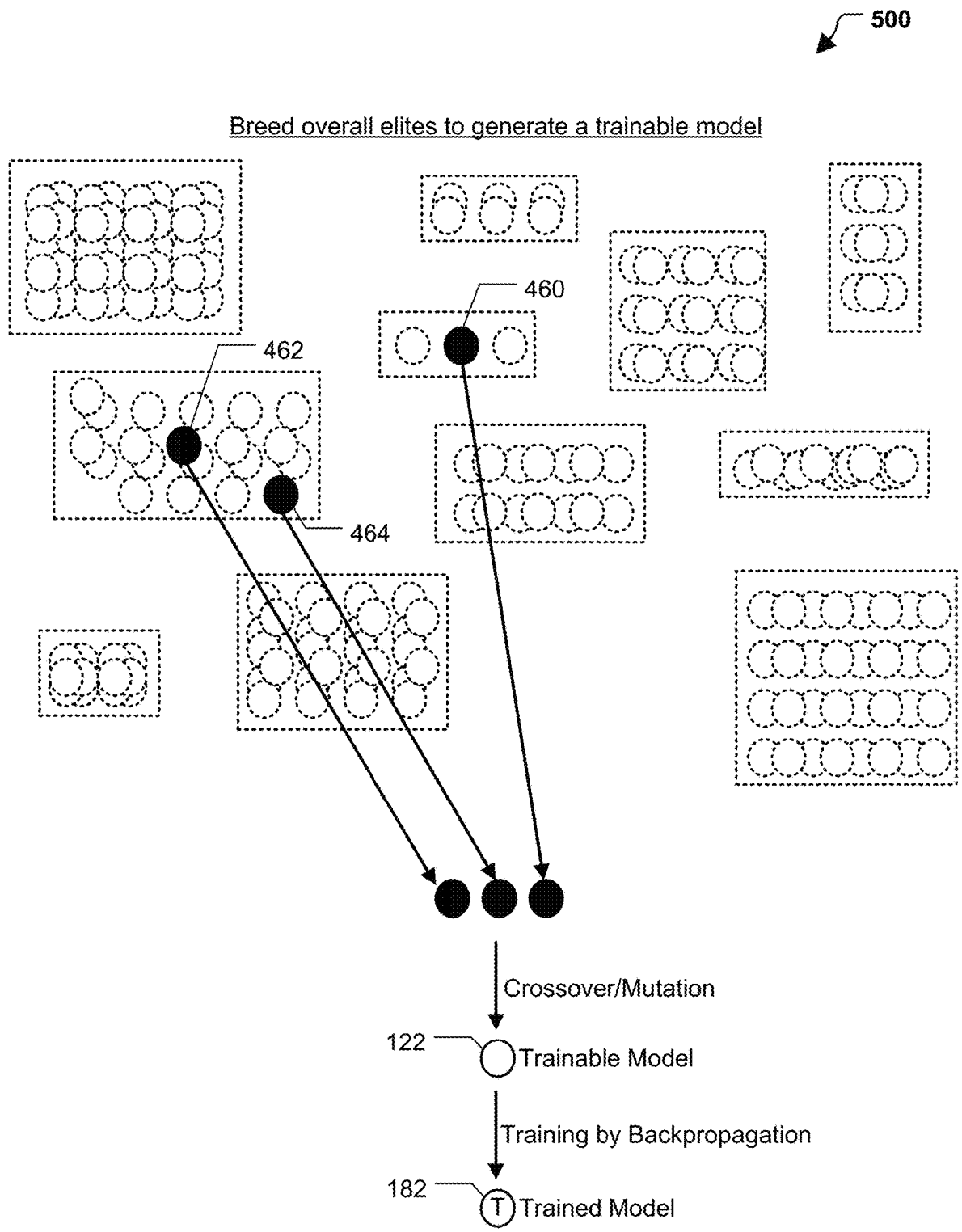
FIG. 5 illustrates a particular example of a fifth stage of operation at the system of FIG. 1.

Referring now to FIG. 5, during an optional fifth stage 500 of operation, the "overall elite" models 460, 462, and 464 may be genetically combined to generate the trainable model 122. For example, genetically combining models may include crossover operations in which a portion of one model is added to a portion of another model, as further illustrated in FIG. 6. As another example, a random mutation may be performed on a portion of one or more of the "overall elite" models 460, 462, 464 and/or the trainable model 122. The trainable model 122 may be sent to the backpropagation trainer 180, as described with reference to FIG. 1. The backpropagation trainer 180 may train connection weights of the trainable model 122 based on a portion of the input data set 102. When training is complete, the resulting trained model 182 may be received from the backpropagation trainer 180 and may be input into a subsequent epoch of the genetic algorithm 110. Although described with respect to the initial epoch, in other implementations, the trainable model 122 is not generated and provided to the backpropagation trainer 180 until a later epoch.

Figure 6:
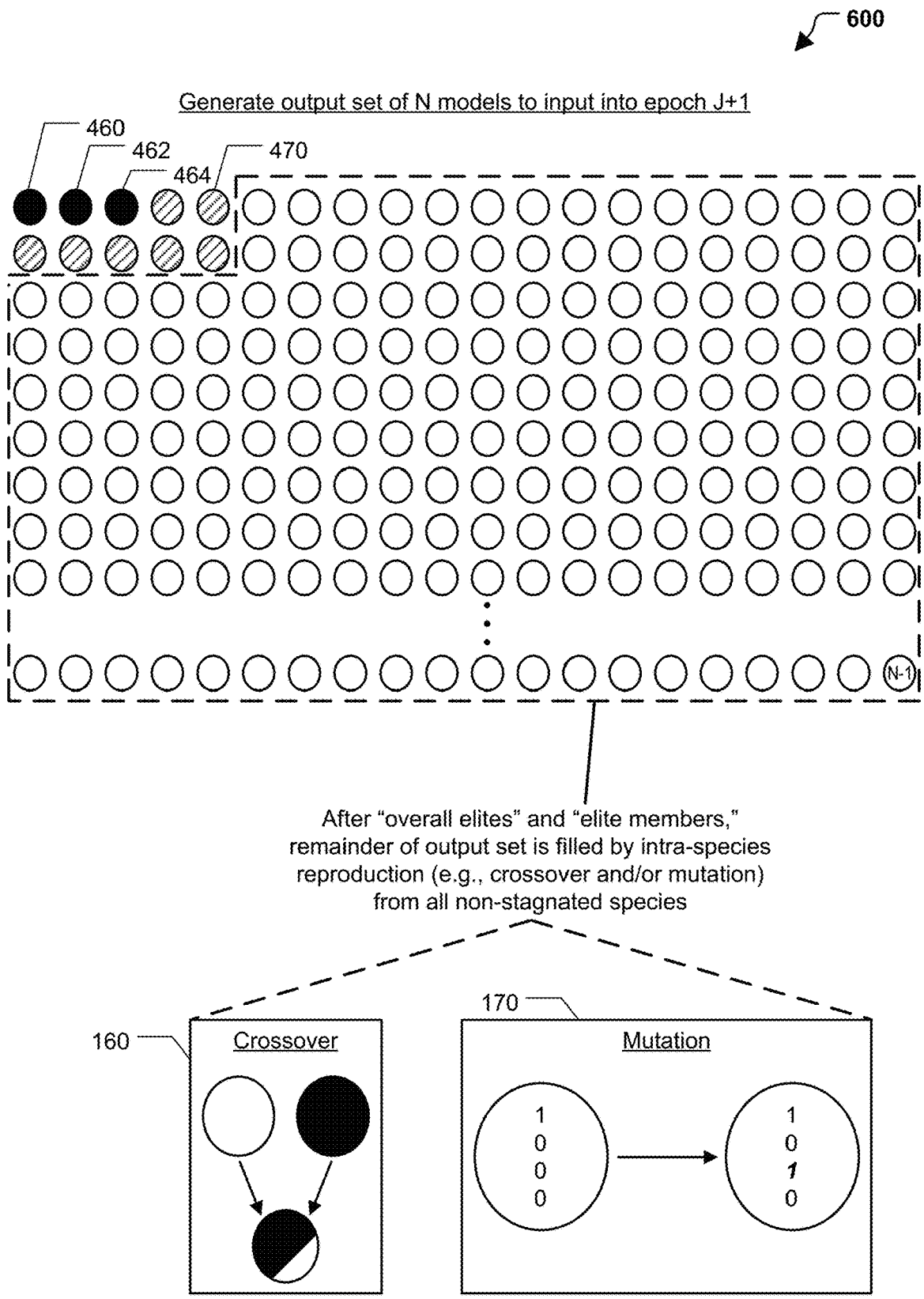
FIG. 6 illustrates a particular example of a sixth stage of operation at the system of FIG. 1.

Continuing to FIG. 6, while the backpropagation trainer 180 trains the trainable model, the output set 130 of the epoch may be generated in a sixth stage 600 of operation. In the illustrated example, the output set 130 includes the same number of models, e.g., 200 models, as the input set 120. The output set 130 may include each of the "overall elite" models 460-464. The output set 130 may also include each of the "elite member" models, including the model 470. Propagating the "overall elite" and "elite member" models to the next epoch may preserve the "genetic traits" (e.g., the values of one or more topological parameters) that resulted in such models being assigned high fitness values.

The rest of the output set 130 may be filled out by intra-species reproduction using the crossover operation 160 and/or the mutation operation 170 and based on the evolutionary weights 174. In the illustrated example, the output set 130 includes 10 "overall elite" and "elite member" models, so the remaining 190 models may be generated based on intra-species reproduction using the crossover operation 160 and/or the mutation operation 170 based on the evolutionary weights 174. During an initial epoch of the genetic algorithm 110, the evolutionary weights 174 may be set to initial values (e.g., default values or preset values) that cause the models to be randomly (or pseudo-randomly) generated. Alternatively, the evolutionary weights 174 may be set to other initial values, such as one or more initial values indicated by a user input. During a subsequent epoch of the genetic algorithm 110, one or more of the evolutionary weights 174 may be modified based on metrics associated with the previous epoch to increase (or decrease) a probability that the mutation operation 170 will perform a particular modification to a particular topological parameter, as further described with reference to FIG. 9. After the output set 130 is generated, the output set 130 may be provided as the input set 120 for the next epoch of the genetic algorithm 110.

During the crossover operation 160, a portion of one model may be combined with a portion of another model, where the size of the respective portions may or may not be equal. To illustrate with reference to the model "encodings" described with respect to FIG. 1, the crossover operation 160 may include concatenating bits 0 to p of one bit string with bits p+1 to q of another bit string, where p and q are integers and p+q is equal to the total size of a bit string that represents a model resulting from the crossover operation 160. When decoded, the resulting bit string after the crossover operation 160 produces a neural network that differs from each of its "parent" neural networks in terms of topology, activation function, aggregation function, bias value/function, link weight, or any combination thereof.

Thus, the crossover operation 160 may be a random or pseudo-random biological operator that generates a model of the output set 130 by combining aspects of a first model of the input set 120 with aspects of one or more other models of the input set 120. For example, the crossover operation 160 may retain a topology of hidden nodes of a first model of the input set 120 but connect input nodes of a second model of the input set 120 to the hidden nodes. As another example, the crossover operation 160 may retain the topology of the first model of the input set 120 but use one or more activation functions of the second model of the input set 120. In some aspects, rather than operating on models of the input set 120, the crossover operation 160 may be performed on a model (or models) generated by mutation of one or more models of the input set 120. For example, the mutation operation 170 may be performed on a first model of the input set 120 to generate an intermediate model and the crossover operation 160 may be performed to combine aspects of the intermediate model with aspects of a second model of the input set 120 to generate a model of the output set 130.

During the mutation operation 170, a portion of a model (e.g., a value of a topological parameter) may be randomly modified or modified in a particular way. The frequency of mutations, or of particular mutations, may be based on the evolutionary weights 174 (also referred to as probabilities or mutation probability metrics). The evolutionary weights 174 may be set to initial values, which may be user-defined or randomly selected/adjusted, during an initial epoch of the genetic algorithm 110. To illustrate with reference to the model "encodings" described with respect to FIG. 1, the mutation operation 170 may include randomly "flipping" one or more bits a bit string (e.g., a value of a topological parameter) during the initial epoch. During a subsequent epoch, one or more of the evolutionary weights 174 may be increased (or decreased) based on metrics associated with the initial epoch such that one or more particular mutations is more likely (or less likely) to result from the mutation operation 170, as further described with reference to FIG. 9.

The mutation operation 170 may thus be a random or pseudo-random biological operator or variable-probability biological operator that generates or contributes to a model of the output set 130 by mutating any aspect of a model of the input set 120. For example, the mutation operation 170 may change the value(s) of one or more topological parameters to cause the topology a particular model of the input set 120 to be modified by addition or omission of one or more input nodes, by addition or omission of one or more connections, by addition or omission of one or more hidden nodes, or a combination thereof. As another example, the mutation operation 170 may change the value(s) of one or more topological parameters to cause one or more activation functions, aggregation functions, bias values/functions, and/or or connection weights to be modified. In some aspects, rather than operating on a model of the input set 120, the mutation operation 170 may be performed on a model generated by the crossover operation 160. For example, the crossover operation 160 may combine aspects of two models of the input set 120 to generate an intermediate model and the mutation operation 170 may be performed on the intermediate model to generate a model of the output set 130.

The genetic algorithm 110 may continue in the manner described above through multiple epochs. In some implementations, when the genetic algorithm 110 receives the trained model 182, the trained model 182 may be provided as part of the input set 120 of a Kth epoch, as shown in a seventh stage 700 of FIG. 7. For example, the trained model 182 may replace one of the other models in the input set 120. During training by the backpropagation trainer 180, the genetic algorithm 110 may have advanced one or more epochs (e.g., X epochs, where X is any integer greater than 0). Thus, when the trained model 182 is received, the trained model 182 may be inserted as input into an epoch subsequent to the epoch during which the corresponding trainable model 122 was provided to the backpropagation trainer 180. To illustrate, if the trainable model 122 was provided to the backpropagation trainer 180 during epoch J, then the trained model 182 may be input into epoch K, where K=J+X. In other implementations, the input set 120 of the seventh stage 700 of FIG. 7 does not include any trained model 182 and optimization training is not performed during execution of the genetic algorithm 110.

Figure 7:
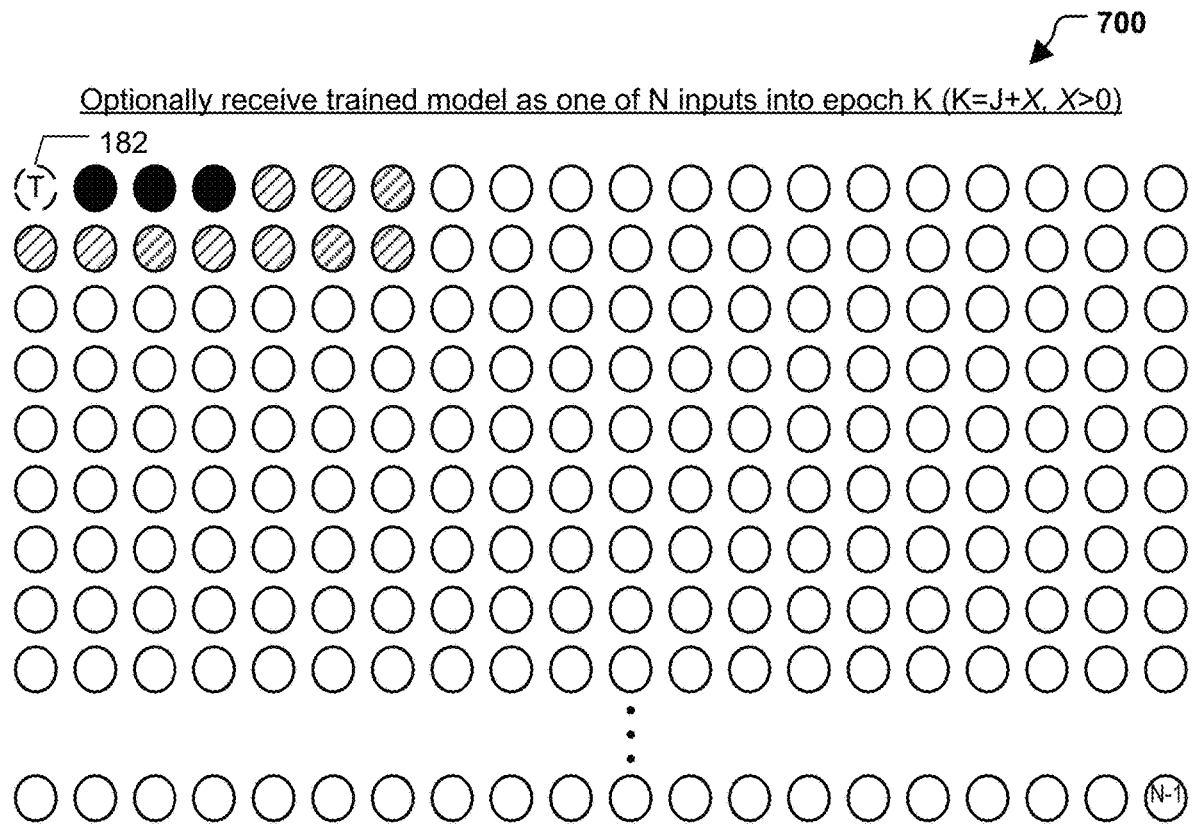
FIG. 7 illustrates a particular example of a seventh stage of operation at the system of FIG. 1.

In the example of FIGS. 5 and 7, a single trainable model 122 is provided to the backpropagation trainer 180 and a single trained model 182 is received from the backpropagation trainer 180. When the trained model 182 is received, the backpropagation trainer 180 becomes available to train another trainable model. Thus, because training takes more than one epoch, trained models 182 may be input into the genetic algorithm 110 sporadically rather than every epoch after the initial epoch. In some implementations, the backpropagation trainer 180 may have a queue or stack of trainable models 122 that are awaiting training. The genetic algorithm 110 may add trainable models 122 to the queue or stack as they are generated and the backpropagation trainer 180 may remove a trainable model 122 from the queue or stack at the start of a training cycle. In some implementations, the system 100 includes multiple backpropagation trainers 180 (e.g., executing on different devices, processors, cores, or threads). Each of the backpropagation trainers 180 may be configured to simultaneously train a different trainable model 122 to generate a different trained model 182. In such examples, more than one trainable model 122 may be generated during an epoch and/or more than one trained model 182 may be input into an epoch.

Figure 8:
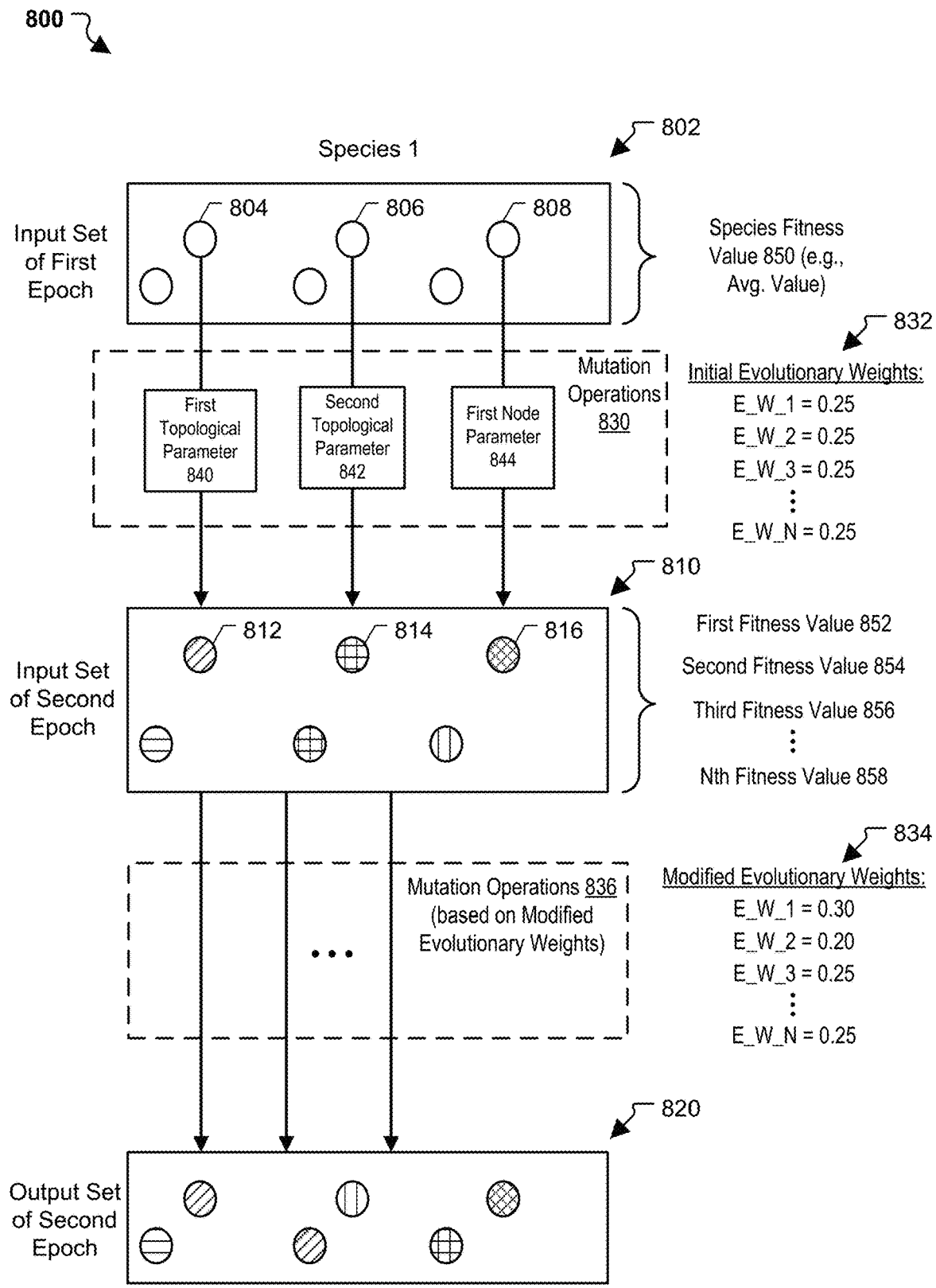
FIG. 8 illustrates a particular example varying evolutionary weights of topological parameters at the system 100 of FIG. 1.

Continuing to FIG. 8, an example 800 of varying mutation rates of particular topological parameters is shown. FIG. 8 illustrates operation of the genetic algorithm 110 during a first epoch, a second epoch, and a third epoch. In a particular implementation, the first epoch is an initial epoch of the genetic algorithm 110, and the second epoch and the third epoch are the next two consecutive epochs. In an alternate implementation, the first epoch is a non-initial epoch, and the second and third epochs are subsequent to the first epoch. In some implementations, the first epoch, the second epoch, and the third epoch are consecutive epochs. In other implementations, the first epoch and the second epoch are separated by at least one epoch, the second epoch and the third epoch are separated by at least one epoch, or both.

FIG. 8 illustrates a first species ("Species 1") of models of an input set of the first epoch. The first species includes a first plurality of models 802 that includes a first model 804, a second model 806, and a third model 808. As described with reference to FIG. 3, the first plurality of models 802 may be categorized as the first species based on genetic distance.

During the first epoch, genetic operations may be performed on models of the first plurality of models 802 to generate models of an output set of the first epoch. The genetic operations may include mutation operations 830 that are performed based on the evolutionary weights 174. Values of the evolutionary weights 174 represent probabilities that mutation operation 170 will change particular topological parameters during a corresponding epoch. The topological parameters may include a number of nodes, a number of connections, a number of input nodes, a number of layers, other parameters indicating a topology of a neural network, or a combination thereof. In some implementations, the evolutionary weights 174 may also represent probabilities that the mutation operation 170 will change particular "node parameters" during a corresponding epoch. As used herein, "node parameters" may include an activation function of a node, an aggregation function of the node, a bias function of the node, other parameters corresponding to a node, or a combination thereof. Further, in some implementations, the evolutionary weights 174 may represent probabilities that the mutation operation 170 will change particular "layer parameters" during a corresponding epoch. As used herein, a "layer parameter" may specify a layer type of each layer (or of each hidden layer). Examples of layer types include long short-term memory (LSTM) layers, gated recurrent units (GRU) layers, fully connected layers, and convolutional neural network (CNN) layers. In some implementations, the layer parameters may be grouped with or included within the topology parameters. In other implementations, layer parameters are distinct from and dealt with separately from topology parameters.

In some implementations, the mutation operation 170 only changes topological parameters or node parameters (e.g., connection weights are not changed by the mutation operation 170). In some implementations, the mutation operation 170 only changes topological parameters or layer parameters (e.g., layer type). In yet other implementation, the mutation operation 170 may change topological parameters, node parameters, and other parameters, such as layer parameters, connection weights, or both, and the evolutionary weights 174 include one or more evolutionary weights associated with such other parameters.

In a particular implementation, the evolutionary weights 174 are set to initial values that cause random (or pseudo-random) mutation operations to be performed as the mutation operations 830. For example, the evolutionary weights 174 may be set to initial evolutionary weights 832, including a first evolutionary weight E_W_1 (that represents a probability that a first topological parameter will be changed) having an initial value of 0.25, a second evolutionary weight E_W_2 (that represents a probability that a second topological parameter will be changed) having an initial value of 0.25, a third evolutionary weight E_W_3 (that represents a probability that a first node parameter will be changed) having an initial value of 0.25, and an Nth evolutionary weight E_W_N (that represents a probability that an Nth topological or node parameter will be changed) having an initial value of 0.25. In other implementations, the evolutionary weights 174 may have other values, such as user-defined values, for the initial evolutionary weights 832. In a particular implementation, the initial evolutionary weights 832 are stored in a memory as part of the evolutionary settings data 172.

The mutation operations 830 may change the values of one or more topological parameters, one or more node parameters, other parameters, or a combination thereof, associated with models of the first plurality of models 802 based on the initial evolutionary weights 832 to generate corresponding output models of the first epoch. For example, a first mutation operation may change a value of a first topological parameter 840 of the first model 804 to generate a fourth model 812, a second mutation operation may change a value of a second topological parameter 842 of the second model 806 to generate a fifth model 814, and a third mutation operation may change a value of a first node parameter 844 of the third model 808 to generate a sixth model 816.

As a particular example, the first topological parameter 840 may be a number of nodes, and the first mutation operation may increase the number of nodes by 2. For example, the first model 804 may have 4 nodes, and the fourth model 812 may have 6 nodes. The second topological parameter 842 may be a number of connections, and the second mutation operation may decrease the number of connections by 1. For example, the second model 806 may have 5 connections, and the fifth model 814 may have 4 connections. The first node parameter 844 may be an activation function, and the third mutation operation may change the activation function. For example, the third model 808 may include a node having a first activation function, and the corresponding node of the sixth model 816 may have a second activation function that is different than the first activation function. Although particular examples of topological parameters, node parameters, and mutations are described, the examples are for illustration and are not intended to be limiting. In other examples, other topological parameters or node parameters may be changed, or other mutations may be performed on the topological parameters or the node parameters, to generate the output set of the first epoch.

The output set of the first epoch may be provided as an input set of the second epoch. For example, the input set of the second epoch may include a second plurality of models 810 that includes the models 812-816. During the second epoch, one or more heuristics may be determined based on one or more models of the input set and one or more models of a previous epoch (e.g., the first epoch). For example, fitness values may be determined for one or more models of the input set based on the fitness function 140. To illustrate, a first fitness value 852 may be determined based on the fourth model 812, a second fitness value 854 may be determined based on the fifth model 814, a third fitness value 856 may be determined based on the sixth model 816, and an Nth fitness value 858 may be determined based on an Nth model of the input set. Additionally, an average fitness value 850 may be determined based on the models of the first species during the first epoch. In other implementations, other fitness values may be determined from the first epoch, such as a maximum fitness value, a median fitness value, a fitness value corresponding to a particular model, etc.

Based on the fitness value from the first epoch (e.g., the average fitness value 850) and the fitness values 852-858, one or more mutations that satisfy one or more thresholds may be identified in order to modify the evolutionary weights 174. To illustrate, the average fitness value 850 may be subtracted from each of the fitness values 852-858, and the results may be compared to a threshold that is indicated by the evolutionary settings data 172. If the results associated with a particular model satisfy the threshold (e.g., the difference between the corresponding fitness value and the average fitness value 850 is greater than or equal to a threshold value), then the particular model is analyzed to determine which parameters were changed by the mutation operations 830, and the evolutionary weight(s) corresponding to the parameter(s) are modified.

To illustrate, an evolutionary weight associated with a particular mutation of a particular parameter may be modified when a change in fitness associated with the particular mutation satisfies the threshold. The modification may be based further on the magnitude of the change in fitness. For example, if the difference between the first fitness value 852 and the average fitness value 850 satisfies the threshold, and the difference has a positive magnitude, then the particular mutation to the first topological parameter may be identified as a "relatively successful" mutation. Thus, the first evolutionary weight E_W_1 may be increased, such that the probability that the first topological parameter is mutated in the particular way during the second epoch is increased. For example, the first evolutionary weight E_W_1 (e.g., a probability that the number of nodes will be increased by 2) may be increased from 0.25 to 0.30. Additionally, if the difference between the second fitness value 854 and the average fitness value 850 satisfies the threshold, and the difference has a negative magnitude, then the particular mutation to the second topological parameter may be identified as a "relatively unsuccessful" mutation. Thus, the second evolutionary weight E_W_2 may be decreased, such that the probability that the second topological parameter is mutated in the particular way during the second epoch is decreased. For example, the second evolutionary weight E_W_2 (e.g., a probability that the number of connections will be decreased by 1) may be decreased from 0.25 to 0.20. Additionally, if the difference between the third fitness value 856 and the average fitness value 850 fails to satisfy the threshold, then third evolutionary weight E_W_3 (e.g., the evolutionary weight associated with the mutation to the first node parameter 844) may remain the same. The above-described modifications to the evolutionary weights 174 are illustrative and, in other examples, other modifications may be made based on the fitness values. In some implementations, the amount by which an evolutionary weight is modified is indicated by the evolutionary settings data 172.

In some implementations, if one or more evolutionary weights are modified, each other evolutionary weight may be modified to compensate. For example, a sum of all the evolutionary weights 174 may be a fixed value (e.g., 1.0, as a non-limiting example), and if one evolutionary weight is increased (or decreased), the remaining evolutionary weights may be decreased (or increased) such that the sum remains the same. In a particular implementation, the sum is indicated by the evolutionary settings data 172. In other implementations, each evolutionary weight is individually adjustable based on related mutations, and a change to one evolutionary weight does not cause a change in another evolutionary weight.

After the evolutionary weights 174 have been modified (to generate modified evolutionary weights 834), mutation operations 836 may be performed based on the modified evolutionary weights 834. For example, the mutation operations 836 may have a higher probability of increasing the number of nodes of a model by 2 and a lower probability of decreasing the number connections by 1, as compared to the mutation operations 830 based on the initial evolutionary weights 832. Performing the mutation operations 836 on the second plurality of models 810 may generate an output set of models for the second epoch. The output set includes a third plurality of models 820. In the particular example illustrated in FIG. 8, the third plurality of models 820 includes more models associated with the particular mutation to the first topological parameter (as indicated by models having diagonal shading) and fewer models associated with the particular mutation to the second topological parameter (as indicated by models having vertical shading) due to the modified evolutionary weights 834 (e.g., modified probabilities).

The third plurality of models 820 may be provided as an input set to a third epoch of the genetic algorithm 110, and during the third epoch, the evolutionary weights 174 may be further modified based on fitness of the third plurality of models 820. In this manner, "relatively successful" mutations may occur more frequently, "relatively unsuccessful" mutations may occur less frequently, or both, which may improve the efficiency of the genetic algorithm 110. For example, increasing the probability that a relatively successful mutation occurs may increase the number of models having a particular mutation, which may increase the speed with which the genetic algorithm 110 converges to one or more final topologies and may improve the overall fitness of the one or more final topologies.

In a particular implementation, the evolutionary weights are selectively modified during each epoch. For example, during each epoch, fitness values may be determined and one or more evolutionary weights may be modified based on the fitness values. In other implementations, the evolutionary weights may be modified for a particular number of epochs. For example, fitness values may be determined and evolutionary weights may be modified once every N epochs, where N is any integer greater than one. For example, evolutionary weights may be selectively modified every other epoch, once every five epochs, once every ten epochs, etc. In some implementations, the modifications to the evolutionary weights may be temporary. For example, an evolutionary weight may be modified for a particular number of epochs, after which the evolutionary weight is returned to a particular value, such as an initial value. Alternatively, the modifications to the evolutionary weights may persist until another modification is made.

In some implementations, one or more metrics (e.g., the fitness values, the difference between fitness values, etc.) are compared to one or more thresholds to determine whether to modify the evolutionary weights. For example, if the difference between fitness values satisfies a threshold, the corresponding evolutionary weight may be modified by a particular amount. Alternatively, the difference may be compared to multiple thresholds, and the amount of modification to the evolutionary weight may be based on how many thresholds are satisfied. For example, if the difference satisfies a first threshold and does not satisfy a second threshold, the corresponding evolutionary weight may be increased (or decreased, based on the magnitude) by a first amount, and if the difference satisfies both thresholds, the corresponding evolutionary weight may be increased (or decreased) by a second amount that is greater than the first amount. For example, if only the first threshold is satisfied, the corresponding evolutionary weight may be modified by 0.05, but if both thresholds are satisfied, the corresponding evolutionary weight may be modified by 0.1.

Additionally, or alternatively, the evolutionary weights 174 may be modified based on other values. For example, one or more evolutionary weights 174 may be modified based on a number of epochs since a previous modification. For example, when a particular evolutionary weight is modified, a corresponding bit, flag, or other indicator may be set in a memory. If the particular evolutionary weight is not modified again within a particular number of epochs, the particular evolutionary weight may be modified regardless of the change in fitness. For example, after a particular number of epochs without additional modification based on fitness changes, a previously modified evolutionary weight may be reset to an initial value, or modified to be closer to the initial value. To illustrate, a first evolutionary weight may be increased by 0.1 during a first epoch, and if the first evolutionary weight is not modified again during epochs two through five, the first evolutionary weight may be decreased by a particular value (e.g., 0.1, 0.05, or another value) during the sixth epoch. In this manner, evolutionary weights may return to initial values unless the modifications are associated with continued changes in fitness.

In some alternate implementations, the differences in fitness values for each model are compared to the differences in fitness values for other models, and the models associated with the largest (or smallest) change may be analyzed to determine which evolutionary weights to modify. In such implementations, comparisons to thresholds are not used. For example, a particular number of models (e.g., one, two, five, etc.) associated with the largest improvements in fitness (or the smallest improvements in fitness) may be identified to determine the particular mutations that resulted in the particular number of models, and the corresponding evolutionary weights may be modified to increase (or decrease) the probability of the particular mutations. Additionally, or alternatively, the amount that an evolutionary weight is modified may be based on the change in fitness associated with the particular mutation to the corresponding topological parameter. For example, if a first mutation to a first topological parameter is associated with an improvement of 0.03 in fitness, and a second mutation to a second topological parameter is associated with an improvement of 0.09 in fitness, a first evolutionary weight corresponding to the first mutation may be increased by 0.03, and a second evolutionary weight corresponding to the second mutation may be increased by 0.09. In other implementations, the modifications to the evolutionary weights may be different amounts, such as a first value associated with a first range of fitness changes and a second value associated with a second range of fitness increases.

In a particular implementation, the evolutionary weights 174 may be modified within a particular range. For example, the evolutionary weights 174 may be modified between a minimum value and a maximum value. The minimum may be greater than 0 and the maximum may be less than 0.5, in a particular implementation. In this manner, no particular mutation becomes impossible, and no particular mutation becomes significantly more likely to occur than not. In other implementations, other values for the minimum and the maximum may be used. Modifications to the evolutionary weights 174 that would exceed the particular range are prevented. For example, regardless of an increase in fitness, a particular evolutionary weight may not be increased above the maximum value (or decreased below the minimum value).

Any of the above-described metrics, ranges, values, or thresholds may be based on pre-set values. For example, the metrics, ranges, values, thresholds, or a combination thereof, may be stored at a memory of the system 100 as the evolutionary settings data 172, such as during initialization or updating of the genetic algorithm 110. Alternatively, any of the metrics, ranges, values, thresholds, or a combination thereof (e.g., any of the values indicated by the evolutionary settings data 172), may be based on user input.

Thus, varying the evolutionary weights 174 during different epochs of the genetic algorithm 110 may improve the neural network architecture search, which may cause the genetic algorithm 110 to converge faster than using genetic algorithms with fixed evolutionary weights. For example, identifying a mutation of a particular topological parameter (or other parameter) that is relatively successful (e.g., that improves fitness at least a threshold amount) and increasing a probability of the particular topological parameter being mutated during one or more epochs may increase the likelihood that more successful topologies are identified and propagated throughout epochs of the genetic algorithm 110. Additionally, the probability of relatively unsuccessful mutations may be decreased, such that less successful topologies are identified and are not propagated. Thus, the most successful topologies may be identified and propagated based on heuristics, which may cause the genetic algorithm 110 to converge faster (e.g., it takes less time to identify the most successful topologies) and may cause the overall fitness of the output of the genetic algorithm 110 to be increased. Improving the speed of convergence of the genetic algorithm 110 may increase efficiency and decrease power consumption of the system 100 associated with executing the genetic algorithm 110.

In at least one implementation, the evolutionary settings data 172 represents a set of rules for executing the genetic algorithm 110. For example, the set of rules may include rules indicating when to modify evolutionary weights (e.g., when a fitness threshold is satisfied), rules indicating how to modify the evolutionary weights (e.g., a modification amount, a permitted range, etc.), other rules, or a combination thereof. In this manner, storage of the rules (e.g., the evolutionary settings data 172) at a memory of the system 100 enables improved performance of the system 100 by decreasing execution time of the genetic algorithm 110, decreased power consumption associated with executing the genetic algorithm 110, or a combination thereof, which represents a technical improvement over systems that execute conventional genetic algorithms.

Figure 9:
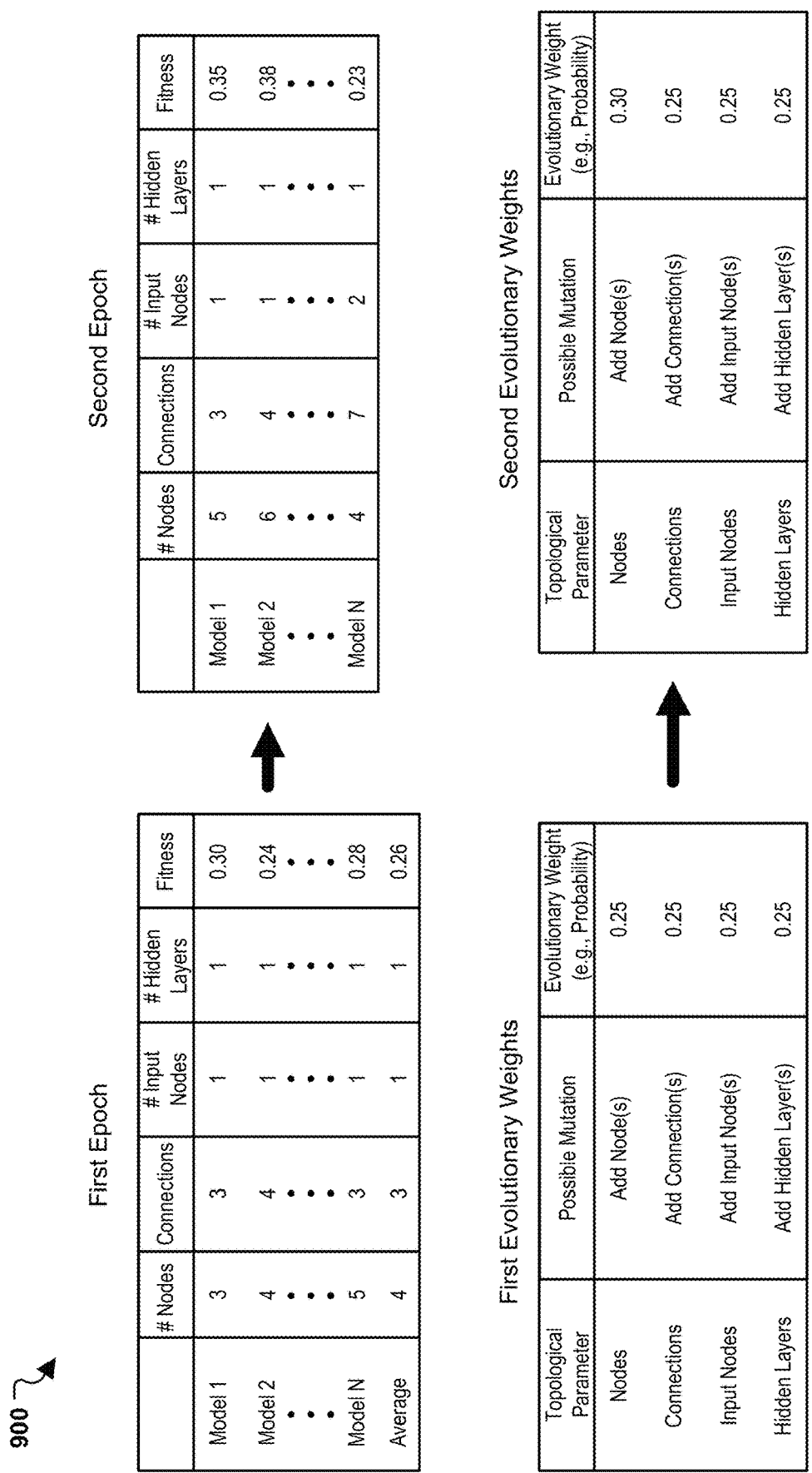
FIG. 9 illustrates a first example of varying evolutionary weights based on one or more metrics.
Figure 10:
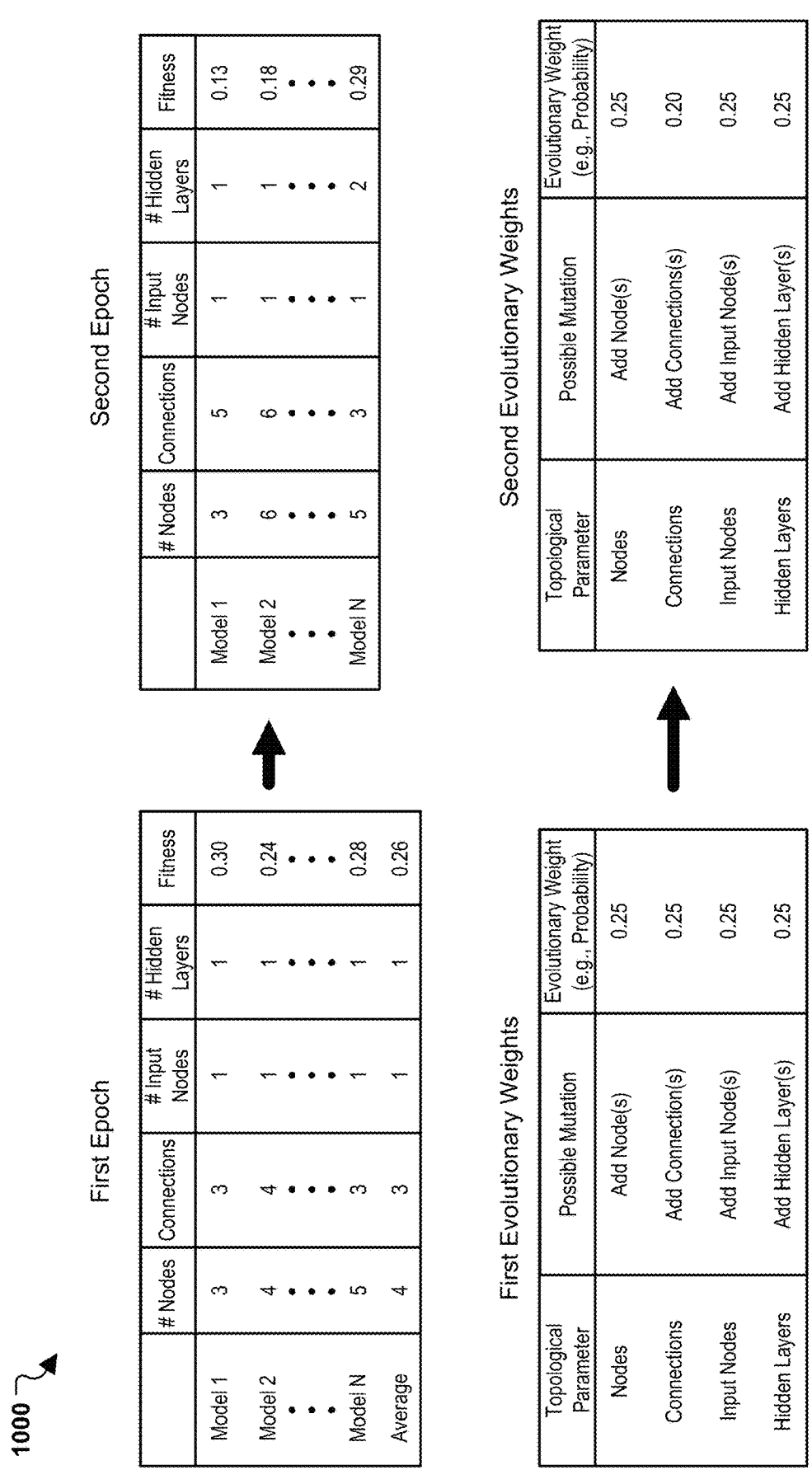
FIG. 10 illustrates a second example of varying evolutionary weights based on one or more metrics.

FIGS. 9-12 illustrate examples of varying evolutionary weights for a particular epoch based on one or more metrics, such as one or more fitness values, of an input set for the particular epoch and one or more previous epochs. FIGS. 9-11 illustrate topological data (e.g., values of topological parameters), metric data (e.g., fitness values), and evolutionary weight data for a first epoch and a second epoch of a genetic algorithm, such as the genetic algorithm 110. Although the examples described with reference to FIGS. 9-11 are directed to modification of topological parameters, in other examples, other parameters may be also modified. For example, node parameters, layer parameters, or both, may be modified along with one or more of the topological parameters. In a particular implementation, the first epoch is an initial epoch. In other implementations, the first epoch is a non-initial epoch. In a particular implementation, the first epoch and the second epoch are consecutive epochs. In other implementations, the first epoch and the second epoch are separated by at least one epoch. FIG. 12 illustrates data for a third epoch and a fourth epoch that are subsequent to the second epoch.

FIG. 9 illustrates a first example 900 of varying evolutionary weights based on one or more metrics. As illustrated in FIG. 9, each model of a particular species of models has a first topological parameter value (e.g., a number of nodes), a second topological parameter value (e.g., a number of connections), a third topological parameter value (e.g., number of input nodes), and a fourth topological parameter value (e.g., number of hidden layers), as well as a fitness value. For example, a first model ("model 1") may have 3 nodes, 3 connections, 1 input node, 1 hidden layer, and a fitness value 0.30, a second model ("model 2") may have 4 nodes, 4 connections, 1 input node, 1 hidden layer, and a fitness value 0.24, and a Nth model ("model N") may have 5 nodes, 3 connections, 1 input node, 1 hidden layer, and a fitness value 0.28. Average values for the particular species for the first epoch include 4 nodes, 3 connections, 1 input node, 1 hidden layer, and an average fitness value 0.26. In other implementations, other parameters may be included (e.g., other topological parameters, node parameters, or layer parameters), and the parameters and fitness values may have other values. In some implementations, the number of input nodes refers to a number of input nodes that are in use, e.g., connected to one or more hidden layers.

During the first epoch, one or more genetic operations may be performed in accordance with first evolutionary weights. For example, evolutionary weights associated with a particular mutation of a particular topological parameter may be set to initial values (e.g., values indicated by the evolutionary settings data 172). To illustrate, a first mutation (adding one or more nodes) to the first topological parameter (number of nodes) is associated with a first evolutionary weight of 0.25, a second mutation (adding one or more connections) to the second topological parameter (number of connections) is associated with a second evolutionary weight of 0.25, a third mutation (adding one or more input node) to the third topological parameter (input nodes) is associated with a third evolutionary weight of 0.25, and a fourth mutation (adding one or more hidden layers) to the fourth topological parameter (hidden layers) is associated with a fourth evolutionary weight of 0.25.

An input set of the second epoch includes one or more models that are generated based on mutation of one or more models of the first epoch. For example, in the second epoch, the first model may have 5 nodes, 3 connections, 1 input node, 1 hidden layer, and a fitness value of 0.35, the second model may have 6 nodes, 4 connections, 1 input node, 1 hidden layer, and a fitness value of 0.38, and the Nth model may have 4 nodes, 7 connections, 2 input nodes, 1 hidden layer, and a fitness value of 0.23.

The fitness values of the models may be compared to the average fitness value of the first epoch, and if the difference satisfies a threshold, a corresponding evolutionary weight may be modified. As a non-limiting example, the threshold may be 0.1, and therefore the second model is identified as satisfying the threshold (e.g., 0.38−0.26=0.12>0.1). The second model may be analyzed (e.g., compared to a "parent" model from the first epoch) to determine a particular modification to a particular topological parameter that resulted in generation of the second model. For example, the number of nodes (e.g., the topological parameter) may have been increased by 2 (e.g., the particular mutation) during the first epoch. Because the magnitude is positive, the evolutionary weight (e.g., the probability) of the particular mutation to the particular topological parameter occurring during the second epoch is increased. For example, the evolutionary weight corresponding to adding one or more nodes may be increased from 0.25 to 0.30. In some implementations, the other evolutionary weights remain the same. In other implementations, modifying one evolutionary weight may cause modification to the other evolutionary weights. For example, if the first evolutionary weight is increased to 0.37, the other three evolutionary weights may be decreased to 0.21, as a non-limiting example.

Thus, FIG. 9 illustrates an example of increasing an evolutionary weight (e.g. a probability) of a particular mutation of a particular topological parameter when a difference in fitness values satisfies a threshold and a magnitude of the difference is positive.

FIG. 10 illustrates a second example 1000 of varying evolutionary weights based on one or more metrics. As illustrated in FIG. 10, each model of a particular species of models has a first topological parameter value (e.g., a number of nodes), a second topological parameter value (e.g., a number of connections), a third topological parameter value (e.g., number of input nodes), and a fourth topological parameter value (e.g., number of hidden layers), as well as a fitness value. For example, a first model ("model 1") may have 3 nodes, 3 connections, 1 input node, 1 hidden layer, and a fitness value 0.30, a second model ("model 2") may have 4 nodes, 4 connections, 1 input node, 1 hidden layer, and a fitness value 0.24, and a Nth model ("model N") may have 5 nodes, 3 connections, 1 input node, 1 hidden layer, and a fitness value 0.28. Average values for the particular species for the first epoch include 4 nodes, 3 connections, 1 input node, 1 hidden layer, and an average fitness value 0.26. In other implementations, other topological parameters may be included, and the topological parameters and fitness values may have other values.

During the first epoch, one or more genetic operations may be performed in accordance with first evolutionary weights. For example, evolutionary weights associated with a particular mutation of a particular topological parameter may be set to initial values (e.g., values indicated by the evolutionary settings data 172). To illustrate, a first mutation (adding one or more nodes) to the first topological parameter (number of nodes) is associated with a first evolutionary weight of 0.25, a second mutation (adding one or more connections) to the second topological parameter (number of connections) is associated with a second evolutionary weight of 0.25, a third mutation (adding one or more input nodes) to the third topological parameter (input nodes) is associated with a third evolutionary weight of 0.25, and a fourth mutation (adding one or more hidden layers) to the fourth topological parameter (hidden layers) is associated with a fourth evolutionary weight of 0.25.

An input set of the second epoch includes one or more models that are generated based on mutation of one or more models of the first epoch. For example, in the second epoch, the first model may have 3 nodes, 5 connections, 1 input node, 1 hidden layer, and a fitness value of 0.13, the second model may have 6 nodes, 6 connections, 1 input node, 1 hidden layer, and a fitness value of 0.18, and the Nth model may have 5 nodes, 3 connections, 1 input node, 2 hidden layers, and a fitness value of 0.29.

The fitness values of the models may be compared to the average fitness value of the first epoch, and if the difference satisfies a threshold, a corresponding evolutionary weight may be modified. As a non-limiting example, the threshold may be 0.1, and therefore the first model is identified as satisfying the threshold (e.g., 0.26−0.13=0.13>0.1). The second model may be analyzed (e.g., compared to a "parent" model from the first epoch) to determine a particular modification to a particular topological parameter that resulted in generation of the second model. For example, the number of connections (e.g., the topological parameter) may have been increased by 2 (e.g., the particular mutation) during the first epoch. Because the magnitude is negative, the evolutionary weight (e.g., the probability) of the particular mutation to the particular topological parameter occurring during the second epoch is decreased. For example, the evolutionary weight corresponding to adding one or more connections may be decreased from 0.25 to 0.20. In some implementations, the other evolutionary weights remain the same. In other implementations, modifying one evolutionary weight may cause modification to the other evolutionary weights. For example, if the second evolutionary weight is decreased to 0.13, the other three evolutionary weights may be increased to 0.29, as a non-limiting example.

Thus, FIG. 10 illustrates an example of decreasing an evolutionary weight (e.g. a probability) of a particular mutation of a particular topological parameter when a difference in fitness values satisfies a threshold and a magnitude of the difference is negative.

FIG. 11 illustrates a third example 1100 of varying evolutionary weights based on one or more metrics. As illustrated in FIG. 11, each model of a particular species of models has a first topological parameter value (e.g., a number of nodes), a second topological parameter value (e.g., a number of connections), a third topological parameter value (e.g., a number of input nodes), and a fourth topological parameter value (e.g., a number of hidden layers), as well as a fitness value. For example, a first model ("model 1") may have 3 nodes, 3 connections, 1 input node, 1 hidden layer, and a fitness value 0.30, a second model ("model 2") may have 4 nodes, 4 connections, 2 input nodes, 1 hidden layer, and a fitness value 0.24, and a Nth model ("model N") may have 5 nodes, 3 connections, 1 input node, 2 hidden layers, and a fitness value 0.28. Average values for the particular species for the first epoch include 4 nodes, 3 connections, 1 input node, 1 hidden layer, and an average fitness value 0.26. In other implementations, other topological parameters may be included, and the topological parameters and fitness values may have other values.

During the first epoch, one or more genetic operations may be performed in accordance with first evolutionary weights. For example, evolutionary weights associated with a particular mutation of a particular topological parameter may be set to initial values (e.g., values indicated by the evolutionary settings data 172). To illustrate, a first mutation (adding one or more nodes) to the first topological parameter (number of nodes) is associated with a first evolutionary weight of 0.25, a second mutation (adding one or more connections) to the second topological parameter (number of connections) is associated with a second evolutionary weight of 0.25, a third mutation (adding one or more input nodes) to the third topological parameter (input nodes) is associated with a third evolutionary weight of 0.25, and a fourth mutation (adding one or more hidden layers) to the fourth topological parameter (hidden layers) is associated with a fourth evolutionary weight of 0.25.

An input set of the second epoch includes one or more models that are generated based on mutation of one or more models of the first epoch. For example, in the second epoch, the first model may have 3 nodes, 4 connections, 1 input node, 1 hidden layer, and a fitness value of 0.24, the second model may have 3 nodes, 4 connections, 3 input nodes, 2 hidden layers, and a fitness value of 0.39, and the Nth model may have 4 nodes, 3 connections, 2 input nodes, 3 hidden layers, and a fitness value of 0.37.

The fitness values of the models may be compared to the average fitness value of the first epoch, and if the difference satisfies a threshold, a corresponding evolutionary weight may be modified. As a non-limiting example, the threshold may be 0.1, and therefore the second model is identified as satisfying the threshold (e.g., 0.39−0.26=0.13>0.1) and the Nth model is identified as satisfying the threshold (e.g., 0.37−0.26=0.11>0.1). The second model and the Nth model may be analyzed (e.g., compared to a "parent" model from the first epoch) to determine particular modifications to one or more particular topological parameters that resulted in generation of the second model and the Nth model. For example, the number of input nodes (e.g., a first particular topological parameter) may have been increased (e.g., a first particular mutation) during the first epoch, and the number of hidden layers (e.g., a second particular topological parameter) may have been increased (e.g., a second particular mutation). Because the magnitudes are positive, the evolutionary weights (e.g., the probabilities) of the particular mutations to the particular topological parameters occurring during the second epoch are increased. For example, the evolutionary weight corresponding to adding one or more input nodes may be increased from 0.25 to 0.30 and the evolutionary weight corresponding to adding one or more hidden layers may be increased from 0.25 to 0.30. In some implementations, the other evolutionary weights remain the same. In other implementations, modifying the two evolutionary weights may cause modification to the other evolutionary weights. For example, if the third and fourth evolutionary weights are increased to 0.30, the other two evolutionary weights may be decreased to 0.20, as a non-limiting example.

Thus, FIG. 11 illustrates an example of increasing multiple evolutionary weights (e.g. probabilities) of particular mutations of particular topological parameters when differences in fitness values satisfy a threshold and magnitudes of the differences are positive.

FIG. 12 illustrates a fourth example 1200 of varying evolutionary weights based on one or more metrics. FIG. 12 illustrates data and evolutionary weights for a third epoch and a fourth epoch that are subsequent to the second epoch of FIG. 11. As illustrated in FIG. 12, during the third epoch, a first model ("model 1") may have 8 nodes, 7 connections, 3 input nodes, 3 hidden layers, and a fitness value 0.24, a second model ("model 2") may have 9 nodes, 9 connections, 1 input node, 2 hidden layers, and a fitness value 0.26, and a Nth model ("model N") may have 7 nodes, 8 connections, 2 input nodes, 3 hidden layers, and a fitness value 0.22.

Average values for the particular species for the first epoch include 8 nodes, 8 connections, 2 input nodes, 2 hidden layers, and an average fitness value 0.23. In other implementations, other topological parameters may be included, and the topological parameters and fitness values may have other values.

During the third epoch, one or more genetic operations may be performed in accordance with first evolutionary weights. For example, third evolutionary weights may include one or more evolutionary weights that were modified during a previous epoch. To illustrate, a first mutation (adding one or more nodes) to the first topological parameter (number of nodes) is associated with a first evolutionary weight of 0.25, a second mutation (adding one or more connections) to the second topological parameter (number of connections) is associated with a second evolutionary weight of 0.25, a third mutation (adding one or more input nodes) to the third topological parameter (input nodes) is associated with a third evolutionary weight of 0.30, and a fourth mutation (adding one or more hidden layers) to the fourth topological parameter (hidden layers) is associated with a fourth evolutionary weight of 0.30.

An input set of the fourth epoch includes one or more models that are generated based on mutation of one or more models of the third epoch. For example, in the second epoch, the first model may have 9 nodes, 7 connections, 3 input nodes, 3 hidden layers, and a fitness value of 0.21, the second model may have 9 nodes, 9 connections, 2 input nodes, 2 hidden layers, and a fitness value of 0.22, and the Nth model may have 10 nodes, 9 connections, 2 input nodes, 3 hidden layers, and a fitness value of 0.24.

The fitness values of the models may be compared to the average fitness value of the third epoch (or previous epochs), and if the difference satisfies a threshold, a corresponding evolutionary weight may be modified. As a non-limiting example, the threshold may be 0.1, and therefore none of the models are identified as satisfying the threshold. Because none of the identified mutations satisfy the threshold, evolutionary weights may be returned to initial values, in order to promote random mutation during the fourth epoch. For example, the evolutionary weight corresponding to adding one or more input nodes may be decreased from 0.30 to 0.25 and the evolutionary weight corresponding to adding one or more hidden layers may be decreased from 0.30 to 0.25. In other implementations, the evolutionary weights that were previously modified may be modified to be closer to the initial values by a particular amount (e.g., 0.025). In other implementations, the third evolutionary weights are not modified if not mutation is associated with a change in fitness that satisfies the threshold.

Thus, FIG. 12 illustrates an example of returning multiple evolutionary weights (e.g. probabilities) of particular mutations of particular topological parameters to initial values when differences in fitness values fail to satisfy a threshold.

Although modifying evolutionary weights associated with topological parameters are described with reference to FIGS. 9-12, node parameters (or other parameters) may be similarly modified. For example, based on a difference in fitness values satisfying a threshold, one or more evolutionary weights associated with one or more node parameters may be modified. As non-limiting examples, an activation function of a particular node may be changed from a first activation function to a second activation function, an aggregation function of a particular node may be changed from a first aggregation function to a second aggregation function, or a bias function of a particular node may be changed from a first bias function to a second bias function. In some implementations, evolutionary weights associated with topological parameters may be modified during a first group of epochs, and evolutionary weights associated with node parameters may be modified during a second group of epochs that is subsequent to the first group of epochs. Modifying the evolutionary weights associated with node parameters after modifying the evolutionary weights associated with topological parameters may cause the genetic algorithm 110 to identify relatively successful topologies during the first group of epochs and then tune the identified topologies during the second group of epochs.

Operation at the system 100 may continue iteratively until specified a termination criterion, such as a time limit, a number of epochs, or a threshold fitness value (of an overall fittest model) is satisfied. When the termination criterion is satisfied, an overall fittest model of the last executed epoch may be selected and output as representing a neural network that best models the input data set 102. In some examples, the overall fittest model may undergo a final training operation (e.g., by the backpropagation trainer 180) before being output.

Although various aspects are described with reference to a backpropagation training, it is to be understood that in alternate implementations different types of training may also be used in the system 100. For example, models may be trained using a genetic algorithm training process. In this example, genetic operations similar to those described above are performed while all aspects of a model, except for the connection weight, are held constant.

Performing genetic operations may be less resource intensive than evaluating fitness of models and training of models using backpropagation. For example, both evaluating the fitness of a model and training a model include providing the input data set 102, or at least a portion thereof, to the model, calculating results of nodes and connections of a neural network to generate output data, and comparing the output data to the input data set 102 to determine the presence and/or magnitude of an error. In contrast, genetic operations do not operate on the input data set 102, but rather merely modify characteristics of one or more models. However, as described above, one iteration of the genetic algorithm 110 may include both genetic operations and evaluating the fitness of every model and species. Training trainable models generated by breeding the fittest models of an epoch may improve fitness of the trained models without requiring training of every model of an epoch. Further, the fitness of models of subsequent epochs may benefit from the improved fitness of the trained models due to genetic operations based on the trained models. Accordingly, training the fittest models enables generating a model with a particular error rate in fewer epochs than using genetic operations alone. As a result, fewer processing resources may be utilized in building highly accurate models based on a specified input data set 102.

The system 100 of FIG. 1 may thus support cooperative, data-driven execution of a genetic algorithm and a backpropagation trainer to automatically arrive at an output neural network model of an input data set. The system of FIG. 1 may arrive at the output neural network model faster than using a genetic algorithm or backpropagation alone and with reduced cost as compared to hiring a data scientist. In some cases, the neural network model output by the system 100 may also be more accurate than a model that would be generated by a genetic algorithm or backpropagation alone. The system 100 may also provide a problem-agnostic ability to generate neural networks. For example, the system 100 may represent a single automated model building framework that is capable of generating neural networks for at least regression problems, classification problems, and reinforcement learning problems. Further, the system 100 may enable generation of a generalized neural network that demonstrates improved adaptability to never-before-seen conditions. To illustrate, the neural network may mitigate or avoid overfitting to an input data set and instead may be more universal in nature. Thus, the neural networks generated by the system 100 may be capable of being deployed with fewer concerns about generating incorrect predictions.

It will be appreciated that the systems and methods of the present disclosure may be applicable in various scenarios, infrastructures, and data environments. As an illustrative non-limiting example, the input data set 102 may include timestamped data from a large array of sensors distributed around a wind farm and may also include timestamped uptime/downtime data of individual wind turbines. The system 100 may generate a neural network model that is configured to predict how likely a wind turbine is to fail. The neural network model may, in a particular example, increase failure lead time from 3-5 days to 30-40 days, which can result in reduced downtime and monetary savings for an operator of the wind farm. The system 100 may be capable of automatically building similar kinds of models that predict numerical values or states (e.g., failures) for internet of things (IoT), utilities, and oil/gas infrastructures.

As another illustrative non-limiting example, the input data set 102 may include health data and the system 100 may automatically build a model to predict whether a patient exhibiting certain health conditions is likely to have a particular ailment. As another illustrative non-limiting example, the input data set 102 may include financial data and the system 100 may automatically build a model to forecast market conditions. As another illustrative non-limiting example, the input data set 102 may include network security, network log, and/or malware data, and the system 100 may automatically build a model to implement firewall filtering rules, endpoint anti-malware detection, a bot/botnet detector, etc.

As another illustrative non-limiting example, the system 100 may generate a neural network to output aircraft autopilot operations (e.g. throttle, steer, flaps, etc.) based on reinforcement learning. In such an example, the reward function optimized by the neural network may involve aircraft altitude, aircraft distance traveled, etc. As yet another example, the system 100 may generate a neural network to predict oil/gas industry workover events (e.g., events that lead to major maintenance or remedial operations on a rig or well, which can lead to considerable production time lost and expense incurred).

Yet another example of a problem set that can be solved with neural networks generated with the system 100 described herein is data fusion. In this case, data aggregated from a large number of sensors of various types, including multiple sensors of the same type, is collected and used to identify an object, action or phenomenon that would not be entirely detectable with any one sensor or with a small subset of sensors. For example, the detection of a submarine may be performed based on the inputs received from multiple sonar buoys which provide input to the generated neural network. Another example may be the identification of a particular type of aircraft based on both the audio signature and a visual view (which may be partially obscured or have a low resolution).

Figure 13A:
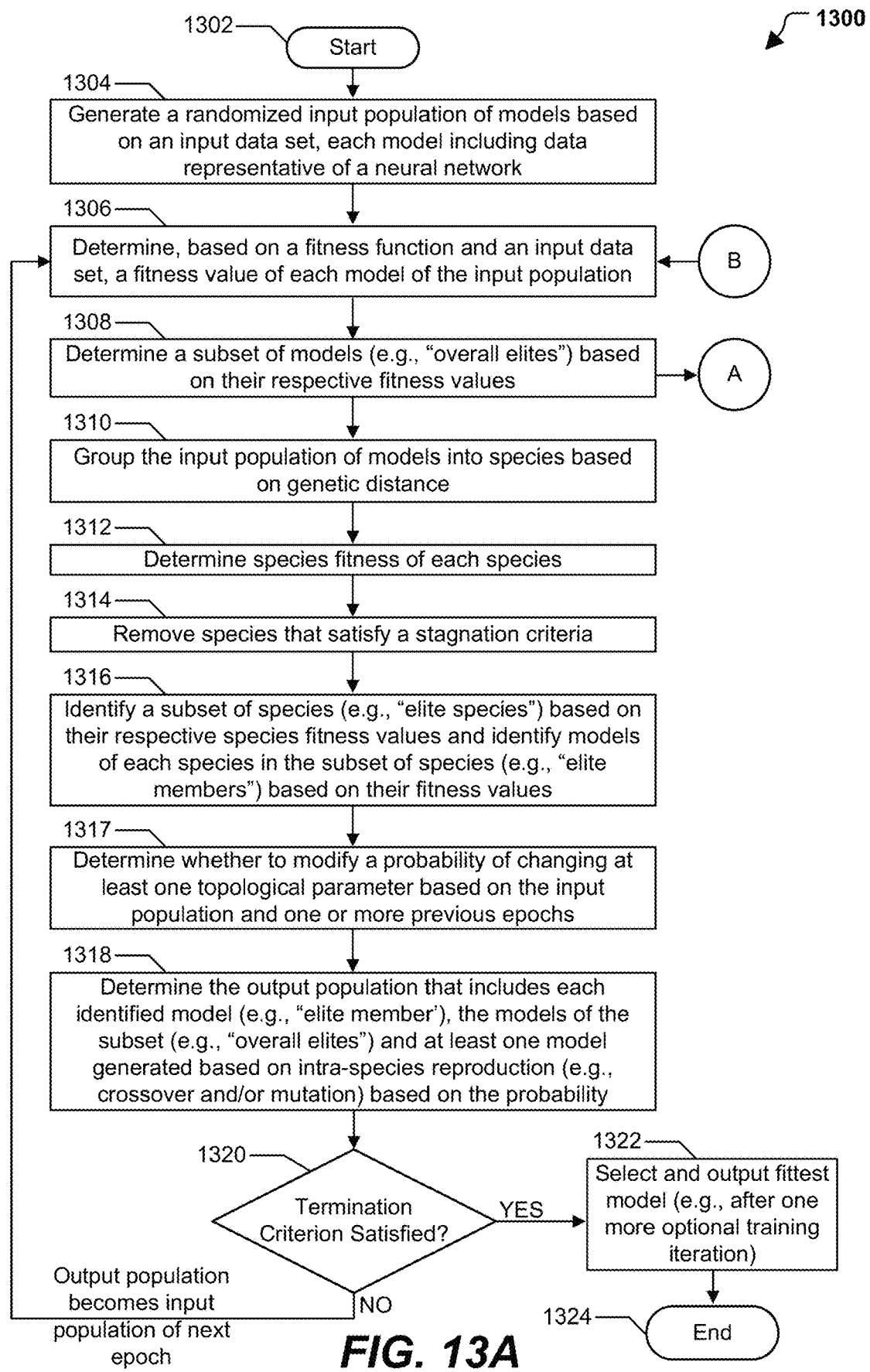
FIGS. 13A and 13B collectively illustrate a particular example of a method of cooperative execution of a genetic algorithm having variable evolutionary weights of topological parameters and a backpropagation trainer.
Figure 13B:
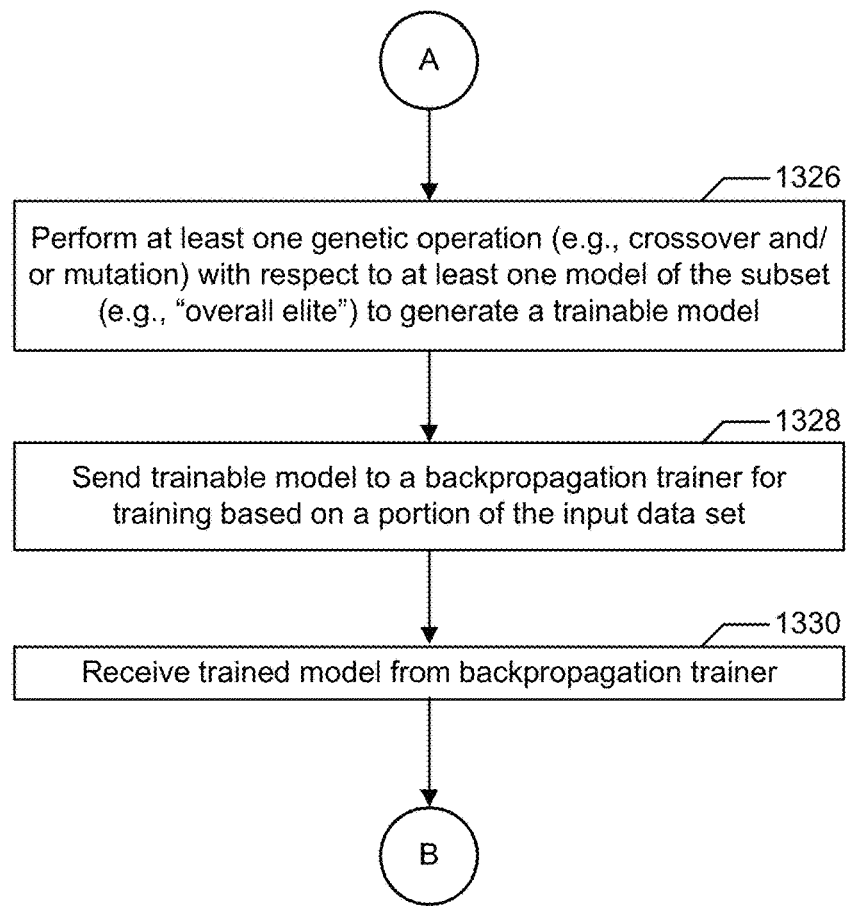

FIGS. 13A and 13B depict a particular example of a method 1300 of cooperative execution of a genetic algorithm and a backpropagation trainer. In an illustrative example, the method 1300 may be performed at the system 100 of FIG. 1.

The method 1300 may start, at 1302, and may include generating a randomized input population of models based on an input data set, at 1304. Each model may include data representative of a neural network. For example, each model may include at least node data and connection data, as described with reference to FIGS. 1 and 2. Further, each of the models may be part of the input set 120 of FIG. 1 and may model the input data set 102 of FIG. 1.

The method 1300 may also include determining, based on a fitness function, a fitness value of each model of the input population, at 1306. For example, the fitness of each model of the input set 120 may be determined, as described with reference to FIGS. 1 and 3.

The method 1300 may further include determining a subset of models based on their respective fitness values, at 1308. The subset of models may be the fittest models of the input population, e.g., "overall elites." For example, "overall elites" may be determined as described with reference to FIGS. 1 and 4.

The method 1300 may include performing multiple sets of operations at least partially concurrently. In a particular implementation, continuing to 1326 (in FIG. 13B), the method 1300 may include performing at least one genetic operation with respect to at least one model of the subset to generate a trainable model. For example, the crossover operation 160 and/or the mutation operation 170 may be performed with respect to the "overall elites" to generate the trainable model 122, as described with reference to FIGS. 1, 4, and 5. In the particular implementation, the method 1300 may also include sending the trainable model to a backpropagation trainer (or other optimization trainer) for training based on a portion of the input data set, at 1328. For example, the backpropagation trainer 180 of FIG. 1 may train the trainable model 122 based on a portion of the input data set 102 to generate the trained model 182, as described with reference to FIGS. 1 and 5.

The genetic algorithm may continue while backpropagation training occurs (in implementations that include backpropagation training). For example, the method 1300 may include grouping the input population of models into species based on genetic distance, at 1310, and determining species fitness of each species, at 1312. To illustrate, the models of the input set 120 may be grouped into species and species fitness may be evaluated as described with reference to FIGS. 1, 3, and 4.

Continuing to 1314, species that satisfy a stagnation criterion may be removed. For example, species satisfying the stagnation criterion 150 may be removed, as described with reference to FIGS. 1 and 4. At 1316, the method 1300 may include identifying a subset of species based on their respective fitness values and identifying models of each species in the subset based on their respective model fitness values. The subset of species may be the fittest species of the input population, e.g., "elite species," and the identified models of the "elite species" may be the fittest members of those species, e.g., "elite members." For example, species fitness values, "elite species," and "elite members" may be determined as described with reference to FIGS. 1 and 4.

The method 1300 may include determining whether to modify a probability of changing at least one topological parameter based on the input population and one or more previous epochs, at 1317. For example, fitness values for a particular species of the input population may be determined and compared to one or more fitness values, such as an average fitness value, of a previous epoch. If the difference between fitness values satisfies a threshold, a model may be identified and analyzed to determine one or more mutations to one or more topological parameters that resulted in generation of the identified model. The evolutionary weight (s) (e.g., a probabilities) associated with the one or more mutations to the one or more topological parameters may be modified (e.g., increased if the difference has a positive magnitude or decreased if the difference has a negative magnitude), as described with reference to FIG. 8. In some implementations, other parameters, such as node parameters, may be similarly modified. In other implementations, other parameters, such as connection weights, may be similarly modified.

The method 1300 may include determining an output population that includes each "elite member," the "overall elites," and at least one model that is generated based on intra-species reproduction based on the probability, at 1318. For example, the models of the output set 130 of FIG. 1 may be determined, where the output set 130 includes the overall elite models 460-464, the elite members (including the elite member model 470), and at least one model generated based on intra-species reproduction using the crossover operation 160 and/or the mutation operation 170, as described with reference to FIGS. 1 and 6. The mutation operation 170 may be based on the modified probability, as described with reference to FIG. 8.

The method 1300 may include determining whether a termination criterion is satisfied, at 1320. The termination criterion may include a time limit, a number of epochs, or a threshold fitness value of an overall fittest model, as illustrative non-limiting examples. If the termination criterion is not satisfied, the method 1300 returns to 1306 and a next epoch of the genetic algorithm is executed, where the output population determined at 1318 is the input population of the next epoch.

As described above, while the genetic algorithm is ongoing, the backpropagation trainer may train the trainable model to generate a trained model. When training is complete, the method 1300 may include receiving the trained model from the backpropagation trainer (or other optimization trainer), at 1330 (in FIG. 13B). The trained model may be added to the input set of an epoch of the genetic algorithm, as shown in FIG. 13B.

When the termination criterion is satisfied, at 1320, the method 1300 may include selecting and outputting a fittest model, at 1322, and the method 1300 may end, at 1324. In some implementations, the selected model may be subjected to a final training operation, e.g., by the backpropagation trainer or by another trainer, before being output.

FIG. 14 depicts a particular example of a method 1400 of execution of a genetic algorithm with variable epoch sizes. In an illustrative example, the method 1400 may be performed at the system 100 of FIG. 1.

The method 1400 includes generating, by a processor of a computing device, an output set of models corresponding to a first epoch of a genetic algorithm, at 1402. The output set of models is based on an input set of models of the first epoch. Each of the input set of models and the output set of models includes data representative of a neural network. For example, the input set of models may include or correspond to the first plurality of models 802, and the output set of models may include or correspond to the second plurality of models 810 of FIG. 8.

The method 1400 includes determining a particular model of the output set of models based on a fitness function, at 1404. A first topological parameter of a first model of the input set of models is modified to generate the particular model of the output set of models. For example, the particular model may include or correspond to the fourth model 812 of FIG. 8.

The method 1400 includes modifying a probability that the first topological parameter is to be changed by a genetic operation during a second epoch of the genetic algorithm that is subsequent to the first epoch, at 1406. For example, the first topological parameter may include or correspond to the first topological parameter 840, and the probability may include or correspond to one of the modified evolutionary weights 834 of FIG. 8. In a particular implementation, the set of output models is provided as a second set of input models to the second epoch. For example, the second plurality of models 810 may be provided as an input set to the second epoch, as described with reference to FIG. 8. In a particular implementation, the genetic operation includes at least one mutation operation, such as the mutation operation 170 of FIG. 1. In a particular implementation, the first epoch and the second epoch are consecutive epochs. Alternatively, the first epoch and the second epoch may be non-consecutive epochs.

The method 1400 further includes generating a second output set of models corresponding to the second epoch, at 1408. The second output set of models is based on the output set of models and the modified probability. For example, the second output set may include or correspond to the third plurality of models 820 of FIG. 8.

In a particular implementation, the method 1400 includes determining a particular modification of the first topological parameter associated with generation of the particular model of the output set of models. Modifying the probability that the first topological parameter is to be changed may include modifying a probability that the genetic operation performs the particular modification to the first topological parameter during the second epoch. For example, a particular modification (e.g., a mutation of the mutation operations 830) that is performed on the first topological parameter 840 to generate the fourth model 812 may be determined, and an evolutionary weight (e.g., E_W_1) associated with the particular modification may be modified, as described with reference to FIG. 8.

In another particular implementation, the method 1400 includes generating a first fitness value associated with one or more of the input set of models based on the fitness function, generating a second fitness value associated with the particular model of the output set of models based on the fitness function, and comparing a difference between the second fitness value and the first fitness value to a threshold. For example, the fitness function may include or correspond to the fitness function 140, the second fitness value may include or correspond to the first fitness value 852, and the threshold may be indicated by the evolutionary settings data 172. The first fitness value may include an average fitness value for a first species of models that includes the first model and the particular model. For example, the first fitness value may include or correspond to the average fitness value 850 for the first species of the first epoch, as described with reference to FIG. 8. Adjusting the probability may include increasing the probability based on the difference satisfying a threshold and having a positive magnitude. For example, the first evolutionary weight E_W_1 may be increased responsive to the difference between the first fitness value 852 and the average fitness value 850 satisfying the threshold and having a positive magnitude. Additionally, or alternatively, adjusting the probability may include decreasing the probability based on the difference satisfying a threshold and having a negative magnitude. For example, the second evolutionary weight E_W_2 may be decreased responsive to the difference between the second fitness value 854 and the average fitness value 850 satisfying the threshold and having a negative magnitude.

In this particular implementation, the method 1400 may further include identifying a second particular model of the second output set of models, determining a third fitness value associated with the second particular model based on the fitness function, comparing a difference between the third fitness value and the second fitness value to the threshold, and modifying a second probability that the first topological parameter is to be changed by a second genetic operation during a third epoch of the genetic algorithm that is subsequent to the second epoch based on the difference between the third fitness value and the second fitness value failing to satisfy the threshold. After modifying the second probability, a difference between the second probability and an initial probability is less than a difference between the probability and the initial probability. For example, when a previously modified evolutionary weight is associated with a change in fitness that fails to satisfy a threshold, the evolutionary weight may be set to an initial value (or modified to be closer to an initial value), as described with reference to FIG. 12.

In another particular implementation, the method 1400 includes determining a second topological parameter of the first model that is modified to generate the particular model of the output set of models and modifying a second probability that the second topological parameter is to be changed by the genetic operation during the second epoch. Determining and modifying multiple evolutionary weights is described with reference to FIG. 11.

In another particular implementation, the method 1400 includes determining a second particular model of the output set of models based on the fitness function, where a second topological parameter of a second model of the input set of models is modified to generate the second particular model of the output set of models. The method 1400 also includes modifying a second probability that the second topological parameter is to be changed by the genetic operation during the second epoch. For example, the second model may include or correspond to the fifth model 814, the second topological parameter may include or correspond to the second topological parameter 842, and the second probability may include or correspond to the second evolutionary weight E_W_2, as described with reference to FIG. 8.

In a particular implementation, the first topological parameter includes a number of nodes, and adjusting the probability includes adjusting a probability that the genetic operation changes the number of nodes in at least one model of the second output set of models. Varying a probability that the number of nodes changes is further described with reference to FIG. 9. In another particular implementation, the first topological parameter includes a number of connections, and adjusting the probability includes adjusting a probability that the genetic operation changes the number of connections in at least one model of the second output set of models. Varying a probability that the number of connections changes is further described with reference to FIG. 10.

In another particular implementation, the method 1400 further includes determining whether to modify a node parameter associated with a particular node of a particular model of the second output set of models during a third epoch of the genetic algorithm based on a fitness value associated with the particular model of the second output set of models. For example, the node parameter may be modified to generate the second particular model, and a corresponding fitness value may be compared to a threshold to determine whether to modify an evolutionary weight associated with the node parameter, as described with reference to FIG. 8. The node parameter may include an activation function, an aggregation function, a bias function, or a combination thereof.

Thus, the method 1400 enables varying evolutionary weights (e.g., probabilities) associated with particular mutations of particular topological parameters during different epochs of the genetic algorithm. Varying the probabilities (e.g., based on metrics associated with at least one previous epoch) may enable the genetic algorithm to generate more models having relatively successful topologies or fewer models having relatively unsuccessful topologies, which improves the neural network architecture search of the genetic algorithm executed by the method 1400. Improving the architecture search may increase a speed with which the genetic algorithm converges, which may improve efficiency and reduce power consumption at a system that performs the method 1400. Additionally, or alternatively, the method 1400 may identify neural network topologies that are relatively more successful, thereby improving the fitness of the output the genetic algorithm.

It is to be understood that the division and ordering of steps in FIGS. 13A, 13B, and 14 is for illustrative purposes only and is not be considered limiting. In alternative implementations, certain steps may be combined and other steps may be subdivided into multiple steps. Moreover, the ordering of steps may change. For example, the termination criterion may be evaluated after determining the "overall elites," at 1308, rather than after determining the output population, at 1318.

In conjunction with the described aspects, a computer system may include a memory that stores an input data set and a first plurality of data structures. For example, each data structure may be a model of a neural network that models the input data set. The computer system may also include at least one processor that is configured to execute a recursive search. For example, the recursive search may be a genetic algorithm to generate a neural network that best models the input data set. During a first iteration of the recursive search, the processor may determine a fitness value for each of the data structures (e.g., neural network models) of the first plurality of data structures based on at least a subset of the input data set. During a second iteration of the recursive search, the processor may generate a second plurality of data structures based on the first plurality of data structures and determine a fitness value for each of the second plurality of data structures based on at least the subset of the input data set. The processor may also compare the fitness values of each of the second plurality of data structures to the fitness values of each of the first plurality of data structures to determine a particular data structure of the second plurality of data structures. The processor may determine a difference in at least one topological parameter between the particular data structure of the second plurality of data structures and a parent data structure of the first plurality of data structures. The processor may also modify a probability that the at least one topological parameter is to be changed during a third iteration of the recursive search. During a third iteration, the processor may generate a third plurality of data structures based at least in part on the modified probability. In a particular implementation, the at least one topological parameter includes a number of nodes, a number of connections, connection weights, an activation function, or any combination thereof.

In conjunction with the described aspects, a method includes, generating, by a processor of a computing device, an output set of models corresponding to a first epoch of a genetic algorithm. The output set of models is based on an input set of models of the first epoch. Each of the input set of models and the output set of models includes data representative of a neural network. The method includes determining a particular model of the output set of models based on a fitness function. A first topological parameter of a first model of the input set of models is modified to generate the particular model of the output set of models. The method includes modifying a probability that the first topological parameter is to be changed by a genetic operation during a second epoch of the genetic algorithm that is subsequent to the first epoch. The method also includes generating a second output set of models corresponding to the second epoch. The second output set of models is based on the output set of models and the modified probability.

In conjunction with the described aspects, a computer-readable storage device stores instructions that, when executed, cause a computer to perform operations including generating an output set of models corresponding to a first epoch of a genetic algorithm. The output set of models is based on an input set of models of the first epoch. Each of the input set of models and the output set of models includes data representative of a neural network. The operations include determining a particular model of the output set of models based on a fitness function. A first topological parameter of a first model of the input set of models is modified to generate the particular model of the output set of models. The operations include modifying a probability that the first topological parameter is to be changed by a genetic operation during a second epoch of the genetic algorithm that is subsequent to the first epoch. The operations also include generating a second output set of models corresponding to the second epoch. The second output set of models is based on the output set of models and the modified probability. In a particular implementation, the operations further include generating a trainable model based on at least one of the second output set of models, sending the trainable model to a trainer, and adding a trained model received from the trainer as input to a third epoch of the genetic algorithm that is subsequent to the second epoch.

In conjunction with the described aspects, a computer system may include a memory that stores instructions and a processor that is coupled to the memory and configured to execute the instructions to perform operations including generating an output set of models corresponding to a first epoch of a genetic algorithm. The output set of models is based on an input set of models of the first epoch. Each of the input set of models and the output set of models includes data representative of a neural network. The operations include determining a particular model of the output set of models based on a fitness function. A first topological parameter of a first model of the input set of models is modified to generate the particular model of the output set of models. The operations include modifying a probability that the first topological parameter is to be changed by a genetic operation during a second epoch of the genetic algorithm that is subsequent to the first epoch. The operations also include generating a second output set of models corresponding to the second epoch. The second output set of models is based on the output set of models and the modified probability.

The systems and methods illustrated herein may be described in terms of functional block components, screen shots, optional selections and various processing steps. It should be appreciated that such functional blocks may be realized by any number of hardware and/or software components configured to perform the specified functions. For example, the system may employ various integrated circuit components, e.g., memory elements, processing elements, logic elements, look-up tables, and the like, which may carry out a variety of functions under the control of one or more microprocessors or other control devices. Similarly, the software elements of the system may be implemented with any programming or scripting language such as C, C++, C#, Java, JavaScript, VBScript, Macromedia Cold Fusion, COBOL, Microsoft Active Server Pages, assembly, PERL, PHP, AWK, Python, Visual Basic, SQL Stored Procedures, PL/SQL, any UNIX shell script, and extensible markup language (XML) with the various algorithms being implemented with any combination of data structures, objects, processes, routines or other programming elements. Further, it should be noted that the system may employ any number of techniques for data transmission, signaling, data processing, network control, and the like.

The systems and methods of the present disclosure may be embodied as a customization of an existing system, an add-on product, a processing apparatus executing upgraded software, a standalone system, a distributed system, a method, a data processing system, a device for data processing, and/or a computer program product. Accordingly, any portion of the system or a module may take the form of a processing apparatus executing code, an internet based (e.g., cloud computing) embodiment, an entirely hardware embodiment, or an embodiment combining aspects of the internet, software and hardware. Furthermore, the system may take the form of a computer program product on a computer-readable storage medium or device having computer-readable program code (e.g., instructions) embodied or stored in the storage medium or device. Any suitable computer-readable storage medium or device may be utilized, including hard disks, CD-ROM, optical storage devices, magnetic storage devices, and/or other storage media. As used herein, a "computer-readable storage medium" or "computer-readable storage device" is not a signal.

Systems and methods may be described herein with reference to screen shots, block diagrams and flowchart illustrations of methods, apparatuses (e.g., systems), and computer media according to various aspects. It will be understood that each functional block of a block diagrams and flowchart illustration, and combinations of functional blocks in block diagrams and flowchart illustrations, respectively, can be implemented by computer program instructions.

Computer program instructions may be loaded onto a computer or other programmable data processing apparatus to produce a machine, such that the instructions that execute on the computer or other programmable data processing apparatus create means for implementing the functions specified in the flowchart block or blocks. These computer program instructions may also be stored in a computer-readable memory or device that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowchart block or blocks.

Accordingly, functional blocks of the block diagrams and flowchart illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based computer systems which perform the specified functions or steps, or suitable combinations of special purpose hardware and computer instructions.

Although the disclosure may include a method, it is contemplated that it may be embodied as computer program instructions on a tangible computer-readable medium, such as a magnetic or optical memory or a magnetic or optical disk/disc. All structural, chemical, and functional equivalents to the elements of the above-described exemplary embodiments that are known to those of ordinary skill in the art are expressly incorporated herein by reference and are intended to be encompassed by the present claims. Moreover, it is not necessary for a device or method to address each and every problem sought to be solved by the present disclosure, for it to be encompassed by the present claims. Furthermore, no element, component, or method step in the present disclosure is intended to be dedicated to the public regardless of whether the element, component, or method step is explicitly recited in the claims. As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

Changes and modifications may be made to the disclosed embodiments without departing from the scope of the present disclosure. These and other changes or modifications are intended to be included within the scope of the present disclosure, as expressed in the following claims.

What is claimed is:

1. A computer system comprising:
    a memory configured to store an input data set and a first plurality of data structures, each of the first plurality of data structures including data representative of a neural network;
    a processor configured to execute a recursive search, wherein executing the recursive search comprises:
        during a first iteration of the recursive search, determining a fitness value for each of the first plurality of data structures based on at least a subset of the input data set;
        during a second iteration of the recursive search:
            generating a second plurality of data structures based on the first plurality of data structures; and
            determining a fitness value for each of the second plurality of data structures based on at least the subset of the input data set;
            comparing the fitness values of each of the second plurality of data structures to the fitness values of each of the first plurality of data structures to determine a particular data structure of the second plurality of data structures;
            determining a difference in at least one topological parameter between the particular data structure of the second plurality of data structures and a parent data structure of the first plurality of data structures;
            modifying a probability that the at least one topological parameter is to be changed during a third iteration of the recursive search to a modified probability; and
            during the third iteration, generating a third plurality of data structures based at least in part on the modified probability.

2. The computer system of claim 1, wherein the at least one topological parameter includes a number of nodes, a number of connections, a number of input nodes, a number of hidden layers, or a combination thereof.

3. A method comprising:
    generating, by a processor of a computing device, an output set of models corresponding to a first epoch of a genetic algorithm, the output set of models based on an input set of models of the first epoch, wherein each of the input set of models and the output set of models includes data representative of a neural network;
    determining a particular model of the output set of models based on a fitness function, wherein a first topological parameter of a first model of the input set of models is modified to generate the particular model of the output set of models;
    determining a second particular model of the output set of models based on the fitness function, wherein a second topological parameter of a second model of the input set of models is modified to generate the second particular model of the output set of models;
    modifying a probability that the first topological parameter is to be changed by a genetic operation during a second epoch of the genetic algorithm that is subsequent to the first epoch to a first probability;
    modifying a probability that the second topological parameter is to be changed by the genetic algorithm during the second epoch to a second probability; and
    generating a second output set of models corresponding to the second epoch, the second output set of models based on the output set of models, the first probability, and the second probability.

4. The method of claim 3, wherein the output set of models are provided as a second input set of models to the second epoch, and wherein the genetic operation includes at least one mutation operation.

5. The method of claim 3, further comprising determining a particular modification of the first topological parameter associated with generation of the particular model of the output set of models, wherein modifying the probability that the first topological parameter is to be changed comprises modifying a probability that the genetic operation performs the particular modification to the first topological parameter during the second epoch.

6. The method of claim 3, further comprising:
    generating a first fitness value associated with one or more of the input set of models based on the fitness function;
    generating a second fitness value associated with the particular model of the output set of models based on the fitness function; and
    comparing a difference between the second fitness value and the first fitness value to a threshold.

7. The method of claim 6, wherein modifying the probability that the first topological parameter is to be changed comprises increasing the probability based on the difference satisfying the threshold and having a positive magnitude.

8. The method of claim 6, wherein modifying the probability that the first topological parameter is to be changed comprises decreasing the probability based on the difference satisfying the threshold and having a negative magnitude.

9. The method of claim 6, wherein the first fitness value comprises an average fitness value for a first species of models, the first species of models including the first model and the particular model.

10. The method of claim 6, further comprising:
identifying a second particular model of the second output set of models, wherein the second particular model is generated based on performance of the genetic operation on the particular model;
determining a third fitness value associated with the second particular model based on the fitness function;
comparing a difference between the third fitness value and the second fitness value to the threshold; and
modifying a particular probability that the first topological parameter is to be changed by a second genetic operation during a third epoch of the genetic algorithm that is subsequent to the second epoch based on the difference between the third fitness value and the second fitness value failing to satisfy the threshold.

11. The method of claim 10, wherein, after modifying the particular probability, a difference between the particular probability and an initial probability is less than a difference between the probability that the first topological parameter is to be changed and the initial probability.

12. The method of claim 3, wherein the first epoch and the second epoch are consecutive epochs.

13. The method of claim 3, further comprising:
determining a second topological parameter of the first model that is modified to generate the particular model of the output set of models; and
modifying a particular probability that the second topological parameter is to be changed by the genetic operation during the second epoch.

14. The method of claim 3, wherein the first topological parameter includes a number of nodes, and wherein modifying the probability that the first topological parameter is to be changed comprises adjusting a probability that the genetic operation changes the number of nodes in at least one model of the second output set of models.

15. The method of claim 3, wherein the first topological parameter includes a number of connections, and wherein modifying the probability that the first topological parameter is to be changed comprises adjusting a probability that the genetic operation changes the number of connections in at least one model of the second output set of models.

16. The method of claim 3, further comprising determining whether to modify a node parameter associated with a particular node of a particular model of the second output set of models during a third epoch of the genetic algorithm based on a fitness value associated with the particular model of the second output set of models.

17. The method of claim 16, wherein the node parameter includes an activation function, an aggregation function, a bias function, or a combination thereof.

18. The method of claim 3, further comprising determining whether to modify a layer parameter associated with a particular layer of a particular model of the second output set of models during a third epoch of the genetic algorithm based on a fitness value associated with the particular model of the second output set of models.

19. A computer-readable storage device storing instructions that, when executed, cause a computer to perform operations comprising:
generating an output set of models corresponding to a first epoch of a genetic algorithm, the output set of models based on an input set of models of the first epoch, wherein each of the input set of models and the output set of models includes data representative of a neural network;
determining a particular model of the output set of models based on a fitness function, wherein a first topological parameter of a first model of the input set of models is modified to generate the particular model of the output set of models;
modifying a probability that the first topological parameter is to be changed by a genetic operation during a second epoch of the genetic algorithm that is subsequent to the first epoch to a first probability;
generating a second output set of models corresponding to the second epoch, the second output set of models based on the output set of models and the first probability; and
determining whether to modify a node parameter associated with a particular node of a particular model of the second output set of models during a third epoch of the genetic algorithm that is subsequent to the second epoch based on a fitness value associated with the particular model of the second output set of models.

20. The computer-readable storage device of claim 19, wherein the operations further comprise:
generating a trainable model based on at least one of the second output set of models;
sending the trainable model to a trainer; and
adding a trained model received from the trainer as input to the third epoch of the genetic algorithm.

21. A method comprising:
generating, by a processor of a computing device, an output set of models corresponding to a first epoch of a genetic algorithm, the output set of models based on an input set of models of the first epoch, wherein each of the input set of models and the output set of models includes data representative of a neural network;
determining a particular model of the output set of models based on a fitness function, wherein a first topological parameter of a first model of the input set of models is modified to generate the particular model of the output set of models;
modifying a probability that the first topological parameter is to be changed by a genetic operation during a second epoch of the genetic algorithm that is subsequent to the first epoch to a first probability;
generating a second output set of models corresponding to the second epoch, the second output set of models based on the output set of models and the first probability; and
determining whether to modify a layer parameter associated with a particular layer of a particular model of the second output set of models during a third epoch of the genetic algorithm subsequent to the second epoch based on a fitness value associated with the particular model of the second output set of models.

22. The method of claim 21, wherein the layer parameter indicates a layer type of the particular layer.

* * * * *